(12) United States Patent
Horimai et al.

(10) Patent No.: US 7,085,217 B2
(45) Date of Patent: Aug. 1, 2006

(54) APPARATUS AND METHOD FOR RECORDING OPTICAL INFORMATION, APPARATUS AND METHOD FOR REPRODUCING OPTICAL INFORMATION, AND APPARATUS AND METHOD FOR RECORDING/REPRODUCING OPTICAL INFORMATION

(75) Inventors: Hideyoshi Horimai, Numazu (JP); Masaharu Kinoshita, Yokohama (JP); Pang Boey Lim, Yokohama (JP); Kenichiro Kumagai, Tokyo (JP)

(73) Assignee: Optware Corporation, Kanagawa (JP)

( * ) Notice: Subject to any disclaimer, the term of this patent is extended or adjusted under 35 U.S.C. 154(b) by 719 days.

(21) Appl. No.: 10/357,708

(22) Filed: Feb. 4, 2003

(65) Prior Publication Data

US 2003/0147328 A1 Aug. 7, 2003

(51) Int. Cl.
*G11B 7/00* (2006.01)
*G03H 1/10* (2006.01)
(52) U.S. Cl. .............................. 369/103; 359/3; 359/10
(58) Field of Classification Search ..................... None
See application file for complete search history.

(56) References Cited

U.S. PATENT DOCUMENTS 5,917,798 A * 6/1999 Horimai et al. ............. 369/103

6,995,882 B1 * 2/2006 Horimai ...................... 369/103

FOREIGN PATENT DOCUMENTS

EP 1065658 1/2001

OTHER PUBLICATIONS

J. Ashley, et al; "Holographic data storage" IBM J.Res. Develop; vol. 44 No. 3 3, May 2000; pp. 341-368.

* cited by examiner

*Primary Examiner*—Thang V. Tran
(74) *Attorney, Agent, or Firm*—Cowan, Liebowitz & Latman, P.C.; Mark Montague

(57) ABSTRACT

In a servo operation, position-controlling light, which is red light, is projected onto a recording medium so as to converge to a minimum diameter on a reflecting surface of the recording medium. In a recording operation, information light and recording-specific reference light, each of which is green light, are projected coaxially onto one side of an information recording layer of the recording medium so as to converge to a minimum diameter at an identical position located off the reflecting surface. Information is recorded in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

18 Claims, 9 Drawing Sheets

APPARATUS AND METHOD FOR RECORDING OPTICAL INFORMATION, APPARATUS AND METHOD FOR REPRODUCING OPTICAL INFORMATION, AND APPARATUS AND METHOD FOR RECORDING/REPRODUCING OPTICAL INFORMATION

BACKGROUND OF THE INVENTION

1. Field of the Invention

The present invention relates to an optical information recording apparatus and method for recording information in a recording medium through the use of holography, an optical information reproducing apparatus and method for reproducing information from a recording medium through the use of holography, and an optical information recording/reproducing apparatus and method for recording information in a recording medium and reproducing the information from the recording medium through the use of holography.

2. Description of the Related Art

In general, holographic recording for recording information in a recording medium through the use of holography is performed by superimposing light that carries image information on reference light within the recording medium and by writing a resultingly generated interference pattern into the recording medium. For reproducing the information recorded, the recording medium is irradiated with reference light such that the image information is reproduced through diffraction derived from the interference pattern.

In recent years, volume holography, or digital volume holography in particular, has been developed and is attracting attention in practical fields for ultra-high density optical recording. Volume holography is a method for writing a three-dimensional interference pattern by making positive use of a recording medium in a direction of its thickness as well, and is characterized in that it is possible to enhance the diffraction efficiency by increasing the thickness of the medium, and a greater recording capacity can be achieved by employing multiplex recording. Digital volume holography is a computer-oriented holographic recording method which uses the same recording medium and recording method as with the volume holography, whereas the image information to be recorded is limited to binary digital patterns. In the digital volume holography, analog image information such as a picture is once digitized and developed into two-dimensional digital pattern information, and then it is recorded as image information. For reproduction, this digital pattern information is read and decoded to restore the original image information for display. Consequently, even if the signal-to-noise ratio (hereinafter referred to as SN ratio) during reproduction is somewhat poor, it is possible reproduce the original information with extremely high fidelity by performing differential detection and/or error correction on the binary data encoded.

Conventional optical information recording/reproducing methods that use holography have had a problem that the reproduced information deteriorates in SN ratio if reproduction-specific reference light is also incident on a photodetector for detecting reproduction light. For that reason, in the conventional optical information recording/reproducing methods, information light and recording-specific reference light are often allowed to be incident on the recording medium with a predetermined angle therebetween at the time of recording, so that reproduction light and reproduction-specific reference light can be spatially separated from each other at the time of reproduction. Consequently, the reproduction light, which occurs at the time of reproduction, travels at a predetermined angle with respect to the reproduction-specific reference light. This allows the reproduction light and the reproduction-specific reference light to be spatially separated from each other.

Nevertheless, when the information light and the recording-specific reference light are allowed to be incident on the recording medium with a predetermined angle therebetween at the time of recording so as to spatially separate the reproduction light and the reproduction-specific reference light from each other at the time of reproduction as described above, there arises a problem that the optical system for recording and reproduction becomes greater in size.

Published Unexamined Japanese Patent Application (KOKAI) Heisei 10-124872 (1998) discloses a technique of recording an interference pattern obtained between information light and recording-specific reference light in an information recording layer in which information is recorded through the use of holography, by projecting the information light and the recording-specific reference light onto the same side of the information recording layer such that the information light and the recording-specific reference light converge at different positions along the thickness of the information recording layer.

This technique, however, has a problem that a special optical system is required for allowing the information light and the recording-specific reference light to converge at different positions.

Published Unexamined Japanese Patent Application (KOKAI) Heisei 10-124872 (1998) mentioned above also discloses a technique in which a part of the cross section of the beam to be projected onto the recording medium is spatially modulated to form the information light while the recording-specific reference light is formed of the other part of the cross section of the beam, and an interference pattern obtained therebetween is recorded in the information recording layer. In this technique, a recording medium is used which has a reflecting surface on a side of the information recording layer opposite to the side to be irradiated with the information light and the recording-specific reference light. Then, an interference pattern obtained between the information light yet to impinge on the reflecting surface and the recording-specific reference light reflected by the reflecting surface and an interference pattern obtained between the recording-specific reference light yet to impinge on the reflecting surface and the information light reflected by the reflecting surface are recorded in the information recording layer.

This technique, however, has a problem that the amount of information recordable is reduced because information can be carried by only a part of the cross section of the beam projected onto the recording medium.

To cope with this, the information light and the recording-specific reference light may be projected onto the recording medium having such a reflecting surface as described above, such that the information light and the recording-specific reference light converge to a minimum diameter on the reflecting surface. In this case, an interference pattern obtained between the information light yet to impinge on the reflecting surface and the recording-specific reference light reflected by the reflecting surface and an interference pattern obtained between the recording-specific reference light yet to impinge on the reflecting surface and the information light reflected by the reflecting surface are recorded in the information recording layer. However, this can cause a problem that when reproduction-specific reference light is projected onto the recording medium so as to converge to a minimum diameter on the reflecting surface at the time of reproduction, the same pattern as that of the information light used for recording and a mirror pattern of the same occur simultaneously from the information recording layer.

OBJECT AND SUMMARY OF THE INVENTION

It is an object of the invention to provide an optical information recording apparatus and method, an optical information reproducing apparatus and method, and an optical information recording/reproducing apparatus and method for recording and/or reproducing information through the use of holography, which allow a small configuration of the optical system for recording and/or reproduction without causing a reduction in the amount of information.

An optical information recording apparatus of the invention is an apparatus for recording information in a recording medium having an information recording layer for information to be recorded in through the use of holography, one side of the information recording layer being irradiated with light for recording or reproducing information, and a reflecting surface being provided on the other side of the information recording layer. The apparatus comprises: an information light generator for generating information light that carries information; a recording-specific reference light generator for generating recording-specific reference light; and a recording optical system for irradiating the information recording layer with the information light generated by the information light generator and the recording-specific reference light generated by the recording-specific reference light generator such that the information is recorded in the information recording layer in the form of an interference pattern resulting from interference between the information light and the recording-specific reference light. The recording optical system projects the information light and the recording-specific reference light coaxially onto the one side of the information recording layer such that the information light and the recording-specific reference light converge to a minimum diameter at an identical position located off the reflecting surface, and thereby records the information in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

An optical information recording method of the invention is a method for recording information in a recording medium having an information recording layer for information to be recorded in through the use of holography, one side of the information recording layer being irradiated with light for recording or reproducing information, and a reflecting surface being provided on the other side of the information recording layer. The method comprises: the step of generating information light that carries information; the step of generating recording-specific reference light; and the recording step in which the information recording layer is irradiated with the information light and the recording-specific reference light such that the information is recorded in the information recording layer in the form of an interference pattern resulting from interference between the information light and the recording-specific reference light. In the recording step, the information light and the recording-specific reference light are projected coaxially onto the one side of the information recording layer such that the information light and the recording-specific reference light converge to a minimum diameter at an identical position located off the reflecting surface, and the information is thereby recorded in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

According to the optical information recording apparatus or method of the invention, the information light and the recording-specific reference light are projected coaxially onto the one side of the information recording layer such that they converge to a minimum diameter at an identical position located off the reflecting surface. Information is thereby recorded in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

In the optical information recording apparatus of the invention, the recording optical system may cause each of the information light and the recording-specific reference light to have directions of polarization that are different between respective half areas of a cross section of a beam thereof such that the direction of polarization of the information light yet to impinge on the reflecting surface coincides with that of the recording-specific reference light reflected by the reflecting surface, and the direction of polarization of the recording-specific reference light yet to impinge on the reflecting surface coincides with that of the information light reflected by the reflecting surface in an identical area in the information recording layer. In this case, the recording optical system may have an optical rotator for optically rotating light passing therethrough in directions different between the respective areas, and may optically rotate, with the optical rotator, each of the recording-specific reference light having a predetermined first direction of polarization and the information light having a second direction of polarization different from the first direction of polarization to cause each of the recording-specific reference light and the information light to have directions of polarization different between the respective areas.

The optical information recording apparatus of the invention may further comprise: a position-controlling information generator for generating position-controlling information by projecting position-controlling light onto the recording medium such that it converges to a minimum diameter on the reflecting surface and receiving the position-controlling light reflected by the reflecting surface, the position-controlling light being used to control the position of the information light and the recording-specific reference light with respect to the recording medium; and a position controller for controlling the position of the information light and the recording-specific reference light with respect to the recording medium based on the position-controlling information generated by the position-controlling information generator. In this case, the information light and the recording-specific reference light may have a predetermined first wavelength, and the position-controlling light may have a second wavelength different from the first wavelength.

An optical information reproducing apparatus of the invention is an apparatus for reproducing information through the use of holography from a recording medium having an information recording layer for information to be recorded in through the use of holography, one side of the information recording layer being irradiated with light for recording or reproducing information, a reflecting surface being provided on the other side of the information recording layer, the information being recorded in the information recording layer based on information light and recording-specific reference light in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface, the information light and the recording-specific reference light being projected coaxially onto the one side of the information recording layer so as to converge to a minimum diameter at an identical position located off the reflecting surface. The apparatus comprises: a reproduction-specific reference light generator for generating reproduction-specific reference light; a reproducing optical system for irradiating the information recording layer with the reproduction-specific reference light generated by the reproduction-specific reference light generator and for collecting reproduction light generated at the information recording layer when irradiated with the reproduction-specific reference light; and a detector for detecting the reproduction light collected by the reproducing optical system. The reproducing optical system projects the reproduction-specific reference light onto the information recording layer such that the reproduction-specific reference light converges to a minimum diameter at the same position where the information light and the recording-specific reference light converge to a minimum diameter, and performs the projection of the reproduction-specific reference light and the collection of the reproduction light on the one side of the information recording layer such that the reproduction-specific reference light and the reproduction light are arranged coaxially.

An optical information reproducing method of the invention is a method for reproducing information through the use of holography from a recording medium having an information recording layer for information to be recorded in through the use of holography, one side of the information recording layer being irradiated with light for recording or reproducing information, a reflecting surface being provided on the other side of the information recording layer, the information being recorded in the information recording layer based on information light and recording-specific reference light in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface, the information light and the recording-specific reference light being projected coaxially onto the one side of the information recording layer so as to converge to a minimum diameter at an identical position located off the reflecting surface. The method comprises: the step of generating reproduction-specific reference light; the reproducing step in which the information recording layer is irradiated with the reproduction-specific reference light generated by the reproduction-specific reference light generator, and reproduction light generated at the information recording layer when irradiated with the reproduction-specific reference light is collected; and the step of detecting the reproduction light. In the reproducing step, the reproduction-specific reference light is projected onto the information recording layer so as to converge to a minimum diameter at the same position where the information light and the recording-specific reference light converge to a minimum diameter, and the projection of the reproduction-specific reference light and the collection of the reproduction light are performed on the one side of the information recording layer such that the reproduction-specific reference light and the reproduction light are arranged coaxially.

According to the optical information reproducing apparatus or method of the invention, the reproduction-specific reference light is projected onto the information recording layer so as to converge to a minimum diameter at the same position where the information light and the recording-specific reference light converge to a minimum diameter, that is, at the position located off the reflecting surface. Then, reproduction light generated at the information recording layer is collected and detected.

In the optical information reproducing apparatus of the invention, the reproducing optical system may have an optical rotator for optically rotating light passing therethrough in directions different between respective half areas of a cross section of a beam of the light. With the optical rotator, the reproducing optical system may optically rotate the reproduction-specific reference light having a predetermined first direction of polarization to convert the same into reproduction-specific reference light having directions of polarization different between the respective areas to irradiate the information recording layer therewith, and may optically rotate the reproduction light and return light resulting from the reproduction-specific reference light reflected by the reflecting surface to convert them into reproduction light having the first direction of polarization over an entire cross section of a beam thereof and return light having a second direction of polarization different from the first direction of polarization over an entire cross section of a beam thereof. In this case, the reproducing optical system may further have a polarization separator for separating the reproduction light having passed through the optical rotator and the return light having passed through the optical rotator from each other depending on a difference in direction of polarization.

The optical information reproducing apparatus of the invention may further comprise: a position-controlling information generator for generating position-controlling information by projecting position-controlling light onto the recording medium such that it converges to a minimum diameter on the reflecting surface and receiving the position-controlling light reflected by the reflecting surface, the position-controlling light being used to control the position of the reproduction-specific reference light with respect to the recording medium; and a position controller for controlling the position of the reproduction-specific reference light with respect to the recording medium based on the position-controlling information generated by the position-controlling information generator. In this case, the reproduction-specific reference light may have a predetermined first wavelength, and the position-controlling light may have a second wavelength different from the first wavelength.

An optical information recording/reproducing apparatus of the invention is an apparatus for recording information in a recording medium having an information recording layer for information to be recorded in through the use of holography, one side of the information recording layer being irradiated with light for recording or reproducing information, and a reflecting surface being provided on the other side of the information recording layer, and for reproducing information from the recording medium. The apparatus comprises: an information light generator for generating information light that carries information; a recording-specific reference light generator for generating recording-specific reference light; a reproduction-specific reference light generator for generating reproduction-specific reference light; a recording/reproducing optical system for, to record information, irradiating the information recording layer with the information light generated by the information light generator and the recording-specific reference light generated by the recording-specific reference light generator such that information is recorded in the information recording layer in the form of an interference pattern resulting from interference between the information light and the recording-specific reference light, and, to reproduce information, irradiating the information recording layer with the reproduction-specific reference light generated by the reproduction-specific reference light generator and collecting reproduction light generated at the information recording layer when irradiated with the reproduction-specific reference light; and a detector for detecting the reproduction light collected by the recording/reproducing optical system.

To record information, the recording/reproducing optical system projects the information light and the recording-specific reference light coaxially onto the one side of the information recording layer such that the information light and the recording-specific reference light converge to a minimum diameter at an identical position located off the reflecting surface, and thereby records the information in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

To reproduce information, the recording/reproducing optical system projects the reproduction-specific reference light onto the information recording layer such that the reproduction-specific reference light converges to a minimum diameter at the same position where the information light and the recording-specific reference light converge to a minimum diameter, and performs the projection of the reproduction-specific reference light and the collection of the reproduction light on the one side of the information recording layer such that the reproduction-specific reference light and the reproduction light are arranged coaxially.

An optical information recording/reproducing method of the invention is a method for recording information in a recording medium having an information recording layer for information to be recorded in through the use of holography, one side of the information recording layer being irradiated with light for recording or reproducing information, and a reflecting surface being provided on the other side of the information recording layer, and for reproducing information from the recording medium. The method comprises: the step of generating information light that carries information; the step of generating recording-specific reference light; the recording step in which the information recording layer is irradiated with the information light and the recording-specific reference light such that the information is recorded in the information recording layer in the form of an interference pattern resulting from interference between the information light and the recording-specific reference light; the step of generating reproduction-specific reference light; the reproducing step in which the information recording layer is irradiated with the reproduction-specific reference light, and reproduction light generated at the information recording layer when irradiated with the reproduction-specific reference light is collected; and the step of detecting the reproduction light.

In the recording step, the information light and the recording-specific reference light are projected coaxially onto the one side of the information recording layer such that the information light and the recording-specific reference light converge to a minimum diameter at an identical position located off the reflecting surface, and the information is thereby recorded in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

In the reproducing step, the reproduction-specific reference light is projected onto the information recording layer so as to converge to a minimum diameter at the same position where the information light and the recording-specific reference light converge to a minimum diameter, and the projection of the reproduction-specific reference light and the collection of the reproduction light are performed on the one side of the information recording layer such that the reproduction-specific reference light and the reproduction light are arranged coaxially.

In the optical information recording/reproducing apparatus of the invention, the recording/reproducing optical system may have an optical rotator for optically rotating light passing therethrough in directions different between respective half areas of a cross section of a beam of the light. In this case, to record information, the recording/reproducing optical system optically rotates, with the optical rotator, each of the recording-specific reference light having a predetermined first direction of polarization and the information light having a second direction of polarization different from the first direction of polarization, and thereby causes each of the information light and the recording-specific reference light to have directions of polarization that are different between respective half areas of a cross section of a beam thereof such that the direction of polarization of the information light yet to impinge on the reflecting surface coincides with that of the recording-specific reference light reflected by the reflecting surface, and the direction of polarization of the recording-specific reference light yet to impinge on the reflecting surface coincides with that of the information light reflected by the reflecting surface in an identical area in the information recording layer. To reproduce information, the recording/reproducing optical system optically rotates, with the optical rotator, the reproduction-specific reference light having the first direction of polarization to convert the same into reproduction-specific reference light having directions of polarization different between the respective areas to irradiate the information recording layer therewith, and optically rotates, with the optical rotator, the reproduction light and return light resulting from the reproduction-specific reference light reflected by the reflecting surface to convert them into reproduction light having the first direction of polarization over an entire cross section of a beam thereof and return light having a second direction of polarization different from the first direction of polarization over an entire cross section of a beam thereof. The recording/reproducing optical system may further have a polarization separator for separating the reproduction light having passed through the optical rotator and the return light having passed through the optical rotator from each other depending on a difference in direction of polarization.

The optical information recording/reproducing apparatus may further comprise: a position-controlling information generator for generating position-controlling information by projecting position-controlling light onto the recording medium such that it converges to a minimum diameter on the reflecting surface and receiving the position-controlling light reflected by the reflecting surface, the position-controlling light being used to control the position of the information light, the recording-specific reference light, and the reproduction-specific reference light with respect to the recording medium; and a position controller for controlling the position of the information light, the recording-specific reference light, and the reproduction-specific reference light with respect to the recording medium based on the position-controlling information generated by the position-controlling information generator. In this case, the information light, the recording-specific reference light, and the reproduction-specific reference light may have a predetermined first wavelength, and the position-controlling light may have a second wavelength different from the first wavelength.

Other objects, features and advantages of the invention will become sufficiently clear from the following description.

DETAILED DESCRIPTION OF THE PREFERRED EMBODIMENTS

Hereinafter, embodiments of the invention will be described in detail with reference to the drawings.

First Embodiment

Figure 1:
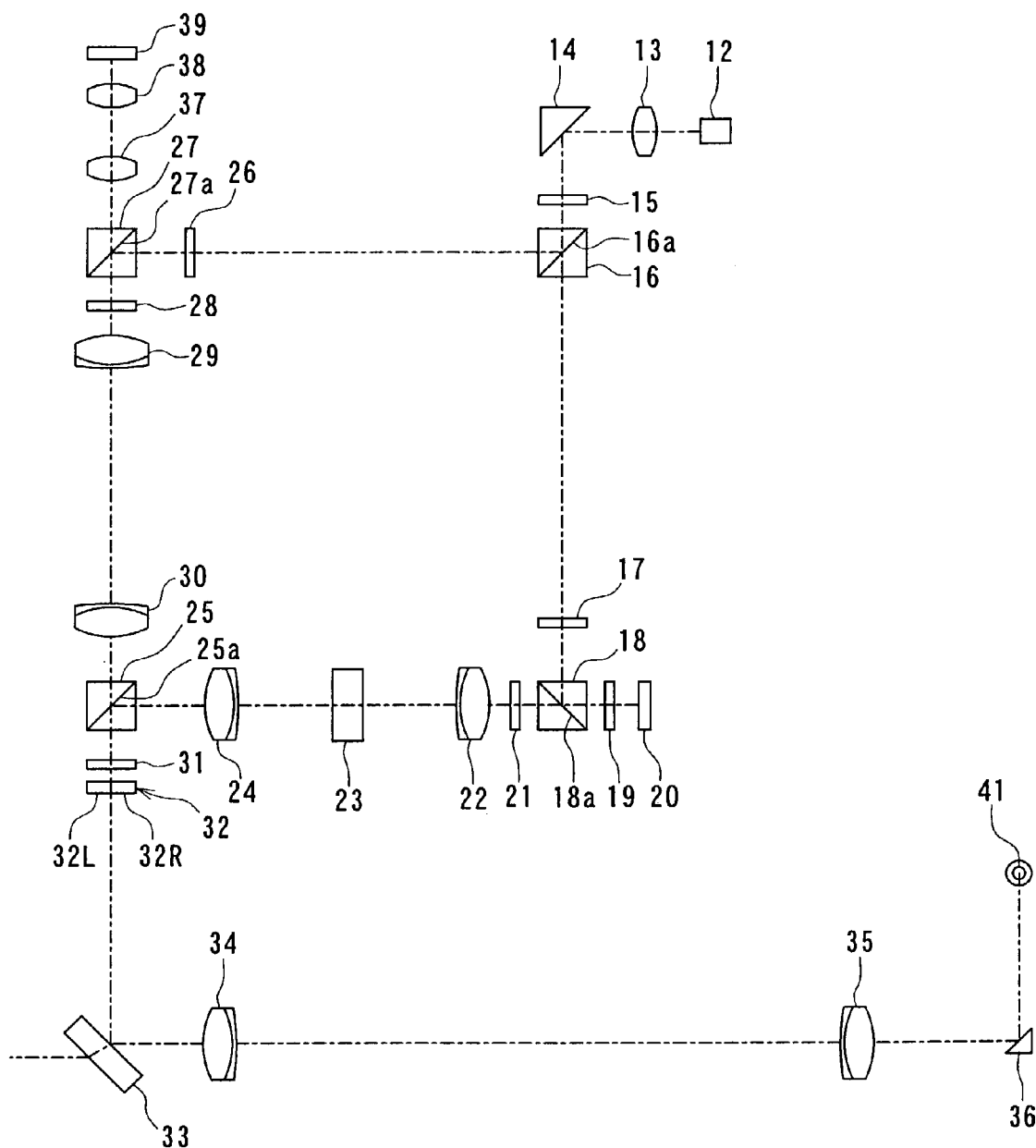
FIG. 1 is an explanatory diagram showing a configuration of essential parts of an optical head of an optical information recording/reproducing apparatus according to a first embodiment of the invention.
Figure 2:
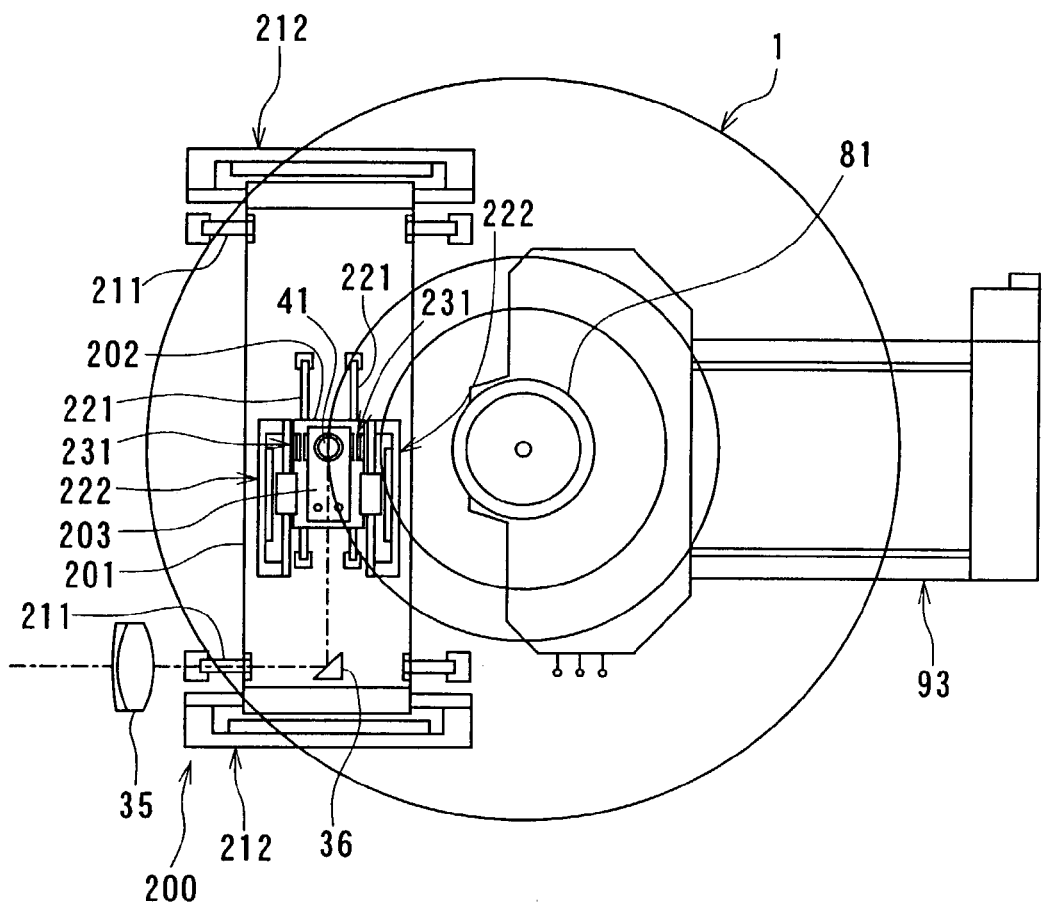
FIG. 2 is a top view showing a movable portion of the optical head and the surroundings thereof in the optical information recording/reproducing apparatus according to the first embodiment of the invention.
Figure 3:
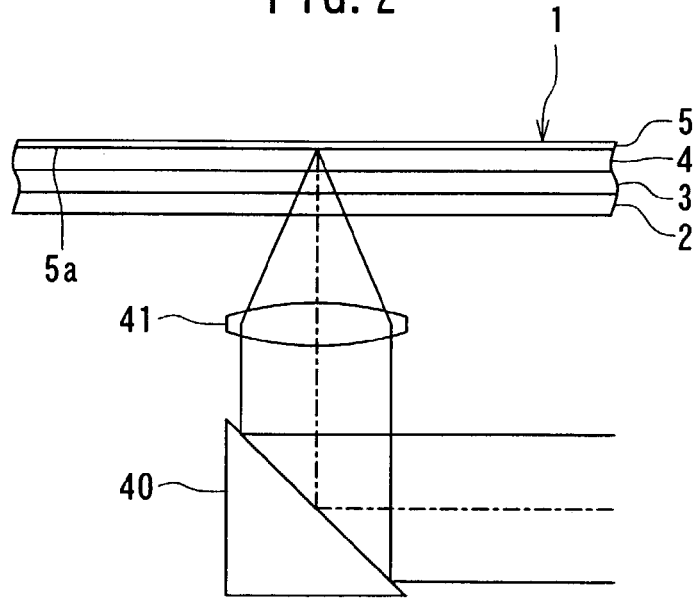
FIG. 3 is an explanatory diagram showing a light-emitting portion of the optical head of the optical information recording/reproducing apparatus according to the first embodiment of the invention and a recording medium.
Figure 4:
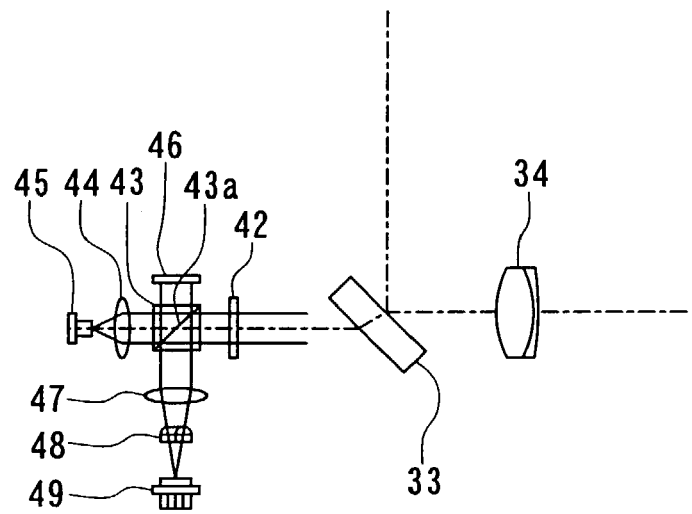
FIG. 4 is an explanatory diagram showing a position-controlling optical system of the optical head in the information recording/reproducing apparatus according to the first embodiment of the invention.
Figure 5:
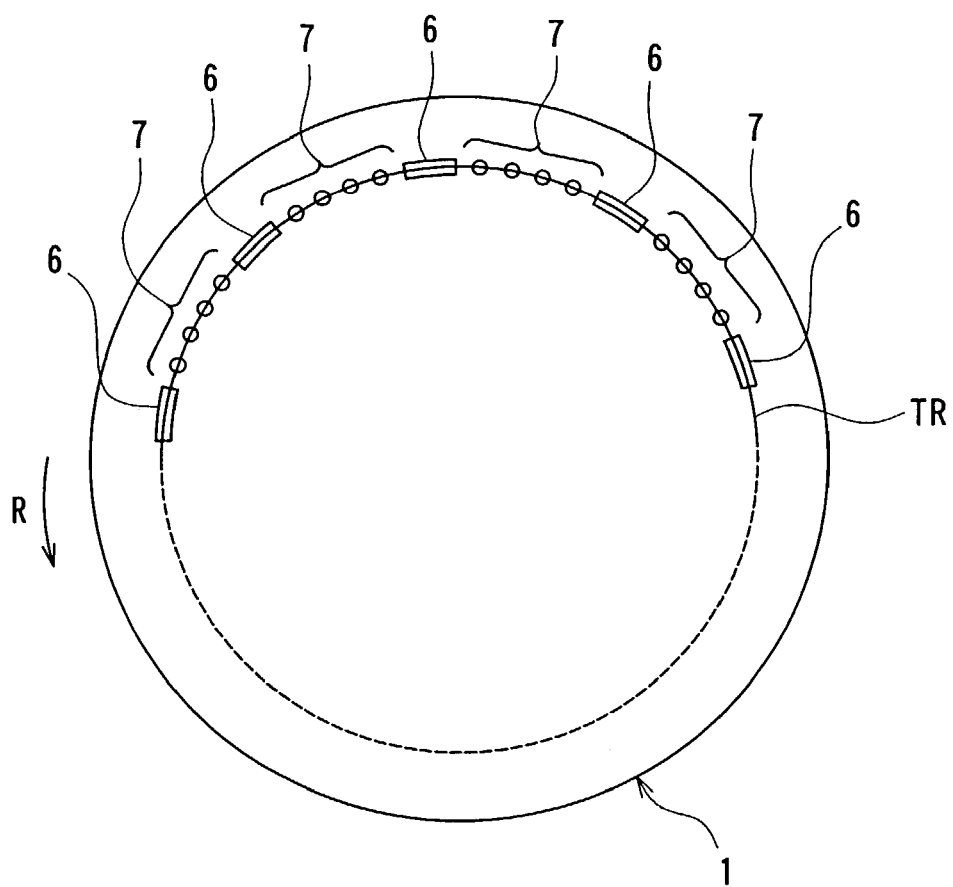
FIG. 5 is an explanatory diagram showing a recording medium used in the first embodiment of the invention.
Figure 6:
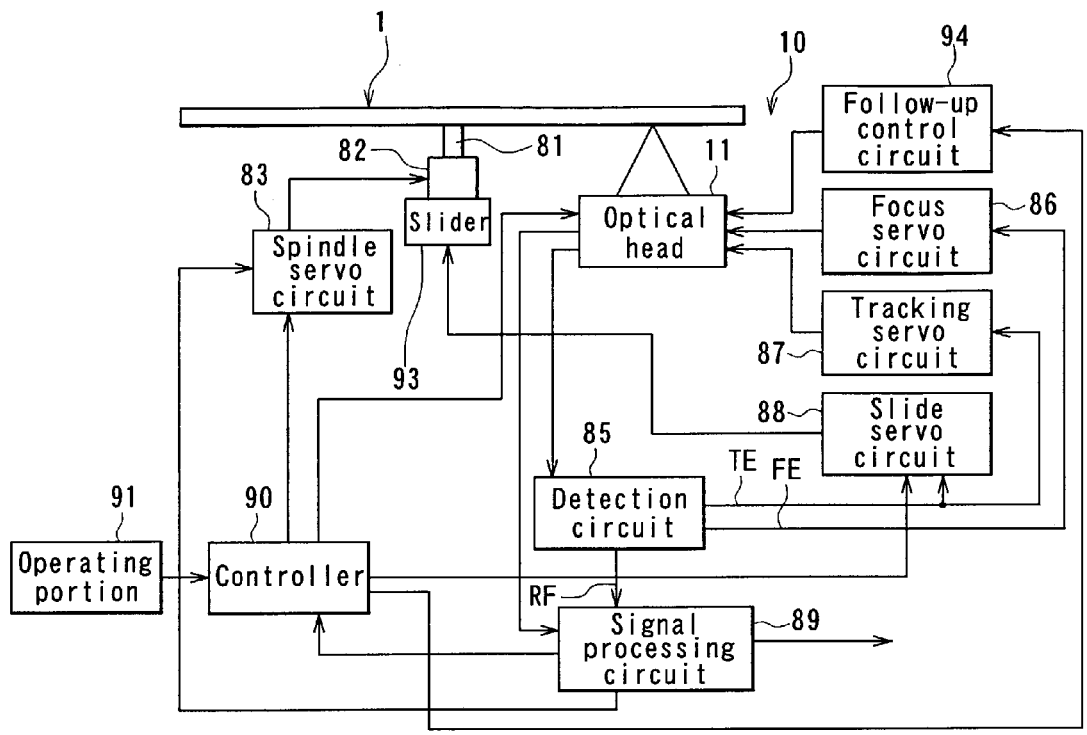
FIG. 6 is a block diagram showing a general configuration of the optical information recording/reproducing, apparatus according to the first embodiment of the invention.

Initially, with reference to FIG. 1 through FIG. 6, description will be given of the configuration of an optical information recording/reproducing apparatus acting as an optical information recording apparatus and an optical information reproducing apparatus according to a first embodiment of the invention. FIG. 1 is an explanatory diagram showing the configuration of essential parts of an optical head of the optical information recording/reproducing apparatus according to the embodiment. FIG. 2 is a top view showing a movable portion of the optical head and the surroundings thereof. FIG. 3 is an explanatory diagram showing a light-emitting portion of the optical head of the optical information recording/reproducing apparatus according to the embodiment and a recording medium. FIG. 4 is an explanatory diagram showing a position-controlling optical system of the optical head. FIG. 5 is an explanatory diagram showing the recording medium used in this embodiment. FIG. 6 is a block diagram showing a general configuration of the optical information recording/reproducing apparatus according to the embodiment.

First, a configuration of the recording medium used in this embodiment will be described with reference to FIG. 3 and FIG. 5. As shown in FIG. 3, the recording medium 1 used in this embodiment comprises a disk-like transparent substrate 2 made of polycarbonate or the like, and an information recording layer 3, a transparent substrate 4, and a reflecting layer 5 that are arranged in this order from the transparent substrate 2, on a side of the transparent substrate 2 opposite from the light incident/outgoing side. The transparent substrate 4 may be replaced with an air gap layer. The information recording layer 3 is a layer in which information is recorded through the use of holography, and is made of a hologram material which varies, when irradiated with light, in its optical characteristics such as refractive index, permittivity, and reflectance, depending on the intensity of the light. For example, hologram materials such as photopolymer HRF-600 (product name) manufactured by Dupont and photopolymer ULSH-500 (product name) manufactured by Aprils may be used. The reflecting layer 5 is made of aluminum, for example. The surface of the reflecting layer 5 facing the transparent substrate 4 serves as a reflecting surface 5a for reflecting light for recording or reproducing information.

FIG. 5 shows part of a track of the recording medium 1. The recording medium 1 is disk-shaped and has a plurality of tracks TR. Each of the tracks TR has a plurality of address servo areas 6 arranged at regular intervals. One or more information recording areas 7 are provided between adjacent ones of the address servo areas 6. FIG. 5 shows an example where four information recording areas 7 are arranged at regular intervals between adjacent ones of the address servo areas 6.

Information for generating a basic clock, i.e., a timing reference for various operations of the optical information recording/reproducing apparatus, information for performing focus servo using a sampled servo system, information for performing tracking servo using the sampled servo system, and address information are recorded in advance in the form of emboss pits in the address servo areas 6. However, the information for performing focus servo is not necessarily required to be recorded in the address servo areas 6. In that case, focus servo may be performed using the reflecting surface 5a. The address information is intended for identifying the individual information recording areas 7. The information for generating a basic clock, the information for performing focus servo, and the information for performing tracking servo serve to adjust the irradiating positions of information light, recording-specific reference light, and reproduction-specific reference light with respect to the information recording areas 7, and correspond to the position-controlling information of the invention.

Next, a configuration of the optical information recording/reproducing apparatus according to the embodiment will be described with reference to FIG. 6. The optical information recording/reproducing apparatus 10 has: a spindle 81 on which the recording medium 1 is mounted; a spindle motor 82 for rotating the spindle 81; a spindle servo circuit 83 for controlling the spindle motor 82 to keep the rotation speed of the recording medium 1 at a predetermined value; and a slider 93 for moving the spindle motor 82 in a horizontal direction. The optical information recording/reproducing apparatus 10 further has an optical head 11 for irradiating the recording medium 1 with information light and recording-specific reference light to thereby record information, and for irradiating the recording medium 1 with reproduction-specific reference light and detecting reproduction light to thereby reproduce information recorded in the recording medium 1.

The optical information recording/reproducing apparatus 10 further has a detection circuit 85, a focus servo circuit 86, a tracking servo circuit 87, and a slide servo circuit 88. The detection circuit 85 detects a focus error signal FE, a tracking error signal TE and a reproduction signal RF from a signal outputted from the optical head 11. The focus servo circuit 86 performs focus servo by driving an actuator in the optical head 11 based on the focus error signal FE detected by the detection circuit 85 to move an objective lens in the optical head 11 in a direction of the thickness of the recording medium 1. The tracking servo circuit 87 performs tracking servo by driving a linear motor in the optical head 11 based on the tracking error signal TE detected by the detection circuit 85 to move the objective lens in a direction of the radius of the recording medium 1. The slide servo circuit 88 performs slide servo by controlling the slider 93 based on the tracking error signal TE and a command from a controller to be described later to move the spindle motor 82 in a horizontal direction.

The optical information recording/reproducing apparatus 10 further has a follow-up control circuit 94. The follow-up control circuit 94 moves the irradiating position of the information light and the recording-specific reference light in a direction generally along the tracks at the time of recording information, so that the irradiating position of the information light and the recording-specific reference light is controlled to follow a single moving information recording area 7 for a predetermined period.

The optical information recording/reproducing apparatus 10 further has a signal processing circuit 89, a controller 90, and an operating portion 91. The signal processing circuit 89 decodes data outputted by a solid state image pick-up device in the optical head 11, which will be described later, to thereby reproduce data recorded in the information recording areas 7 of the recording medium 1. It also reproduces a basic clock and determines addresses from the reproduction signal RF from the detection circuit 85. The controller 90 controls the optical information recording/reproducing apparatus 10 as a whole, and the operating portion 91 supplies various instructions to the controller 90. The controller 90 receives input of the basic clock and address information outputted by the signal processing circuit 89 and controls the parts such as the optical head 11, the spindle servo circuit 83, the slide servo circuit 88 and the follow-up control circuit 94. The basic clock outputted by the signal processing circuit 89 is inputted to the spindle servo circuit 83. The controller 90: has a CPU (central processing unit), a ROM (read only memory) and a RAM (random access memory). The CPU executes programs stored in the ROM using the RAM as a work area to perform the functions of the controller 90.

Next, with reference to FIG. 1, description will be given of the configuration of essential parts of the optical head 11 according to this embodiment. The optical head 11 has a light source device 12 that emits coherent linearly polarized laser light, and a collimator lens 13, a mirror 14, a half-wave plate 15, and a polarization beam splitter 16 that are arranged in this order from the light source device 12 on the optical path of the light emitted by the light source device 12. For example, the light source device 12 is a semiconductor laser for emitting green light of a single wavelength. Green light refers to light whose wavelength falls within the range of approximately 492 to 577 nm. The wavelength of the green light emitted by the light source device 12 corresponds to the first wavelength of the invention. The polarization beam splitter 16 has a polarization beam splitter surface 16a for reflecting S-polarized light and transmitting P-polarized light. S-polarized light is linear polarized light whose direction of polarization is perpendicular to the plane of incidence (plane of the drawing sheet of FIG. 1). P-polarized light is linear polarized light whose direction of polarization is in parallel with the plane of incidence.

The optical head 11 further has a half-wave plate 17 and a polarization beam splitter 18 that are arranged in this order from the polarization beam splitter 16 along the traveling direction of light that impinges on the polarization beam splitter 16 from the half-wave plate 15 and is transmitted through the polarization beam splitter surface 16a. The polarization beam splitter 18 has a polarization beam splitter surface 18a for reflecting S-polarized light and transmitting P-polarized light.

The optical head 11 further has a quarter-wave plate 19 and a reflection type spatial light modulator 20 that are arranged in this order from the polarization beam splitter 18 along the traveling direction of light that impinges on the polarization beam splitter 18 from the half-wave plate 17 and is reflected by the polarization beam splitter surface 18a. The reflection type spatial light modulator 20 has a number of pixels arranged in a matrix, and is capable of generating information light carrying information by spatially modulating light in terms of intensity by selecting a light-transmitting state or a light-blocking state for each of the pixels.

The optical head 11 further has a half-wave plate 21, a convex lens 22, a pin hole 23, a convex lens 24, and a polarization beam splitter 25 that are arranged in this order from the polarization beam splitter 18 along the traveling direction of light that impinges on the polarization beam splitter 18 from the quarter-wave plate 19 and is transmitted through the polarization beam splitter surface 18a. The polarization beam splitter 25 has a polarization beam splitter surface 25a for reflecting S-polarized light and transmitting P-polarized light.

The optical head 11 further has a phase spatial light modulator 26 and a polarization beam splitter 27 that are arranged in this order from the polarization beam splitter 16 along the traveling direction of light that impinges on the polarization beam splitter 16 from the half-wave plate 15 and is reflected by the polarization beam splitter surface 16a. The phase spatial light modulator 26 has a number of pixels arranged in a matrix, and is capable of spatially modulating the phase of light by selecting the phase of the outgoing light for each of the pixels. A liquid crystal element may be used as the phase spatial light modulator 26. The polarization beam splitter 27 has a polarization beam splitter surface 27a for reflecting S-polarized light and transmitting P-polarized light.

The optical head 11 further has a half-wave plate 28, a convex lens 29, and a convex lens 30 that are arranged in this order from the polarization beam splitter 27 along the traveling direction of light that impinges on the polarization beam splitter 27 from the phase spatial light modulator 26 and is reflected by the polarization beam splitter surface 27a. The light having passed through the convex lenses 29 and 30 travels in a direction orthogonal to the traveling direction of light incident on the polarization beam splitter 25 from the convex lens 24, and then impinges on the polarization beam splitter 25.

The optical head 11 further has a shortwave pass filter 31, a two-way split optical rotation plate (gyrator) 32, and a dichroic mirror 33 that are arranged in this order from the polarization beam splitter 25 along the traveling direction of light that impinges on the polarization beam splitter 25 from the convex lens 24 and is reflected by the polarization beam splitter surface 25a and light that impinges on the polarization beam splitter 25 from the convex lens 30 and is transmitted through the polarization beam splitter surface 25a. The shortwave pass filter 31 transmits green light and blocks red light. Red light refers to light whose wavelength falls within the range of approximately 622 to 770 nm. The two-way split optical rotation plate 32 includes optical rotation plates 32L and 32R disposed on the left side and the right side, respectively, of the optical axis as viewed in FIG. 1. The optical rotation plate 32R causes a −45° rotation of the direction of polarization, while the optical rotation plate 32L causes a +45° rotation of the direction of polarization. The two-way split optical rotation plate 32 corresponds to the optical rotator of the invention. The dichroic mirror 33 reflects green light and transmits red light.

The optical head 11 further has a convex lens 34, a convex lens 35, and a mirror 36 that are arranged in this order from the dichroic mirror 33 along the traveling direction of light that impinges on the dichroic mirror 33 from the two-way split optical rotation plate 32 and is reflected by the same.

Light that impinges on the mirror 36 from the convex lens 35 and is reflected by the mirror 36 impinges on the movable portion shown in FIG. 2.

The optical head 11 further has an imaging lens 37, an imaging lens 38, and a solid state image pick-up device 39 that are arranged in this order from the polarization beam splitter 27 along the traveling direction of light that impinges on the polarization beam splitter 27 from the half-wave plate 28 and is transmitted through the polarization beam splitter surface 27a. For example, a CCD or an MOS type solid state image pick-up device is used as the solid state image pick-up device 39.

The optical head 11 further has the position-controlling optical system shown in FIG. 4. The position-controlling optical system has a red transmission filter 42, a beam splitter 43, a collimator lens 44, and a light source device 45 that are arranged in this order from the dichroic mirror 33, on a side of the dichroic mirror 33 opposite from the convex lens 34. The beam splitter 43 has a semi-reflecting surface 43a whose normal direction is inclined 45° with respect to the direction of the optical axis of the collimator lens 44. The red transmission filter 42 transmits red light and blocks light of the other wavelength bands. For example, the light source device 45 is a semiconductor laser for emitting red light of a single wavelength. The wavelength of the red light emitted by the light source device 45 corresponds to the second wavelength of the invention. The optical head 11 further has a photodetector 46 disposed in the traveling direction of light that impinges on the beam splitter 43 from the collimator lens 44 and is reflected by the semi-reflecting surface 43a. The photodetector 46 is used to monitor the quantity of light emitted by the light source device 45 and perform auto adjustment of the quantity of light emitted by the light source device 45.

The optical head 11 further has a convex lens 47, a cylindrical lens 48, and a four-way split photodetector 49 that are arranged in this order from the beam splitter 43, on a side of the beam splitter 43 opposite from the photodetector 46. The four-way split photodetector 49 has four light-receiving portions divided by a division line that is parallel to a direction corresponding to the direction of tracks of the recording medium 1 and a division line that is orthogonal thereto. The cylindrical lens 48 is provided such that the central axis of the cylindrical surface thereof forms an angle of 45° with respect to the division lines of the four-way split photodetector 49.

Now, the configuration of the movable portion of the optical head 11 will be described with reference to FIG. 2 and FIG. 3. The movable portion 200 of the optical head 11 has an objective lens 41 and a mirror 40 that constitute part of the recording/reproducing optical system. As shown in FIG. 3, the objective lens 41 is located to face the transparent substrate 2 of the recording medium 1. The mirror 40 is located on a side of the objective lens 41 opposite from the recording medium 1.

The movable portion 200 of the optical head 11 includes a first movable portion 201 and a second movable portion 202. Two rails 211 extending in a radial direction of the recording medium 1 (horizontal direction in FIG. 2) are attached to the body of the optical information recording/reproducing apparatus. The first movable portion 201 is supported by the two rails 211 so as to be movable in a radial direction of the recording medium 1. The optical head 11 further has linear motors 212 for moving the first movable portion 201 with respect to the body of the optical information recording/reproducing apparatus in a radial direction of the recording medium 1.

Two rails 221 extending in a tangential direction of the tracks (vertical direction in FIG. 2) are attached to the first movable portion 201. The second movable portion 202 is supported by the two rails 221 so as to be movable in a tangential direction of the tracks. The optical head 11 further has linear motors 222 for moving the second movable portion 202 with respect to the first movable portion 201 in a tangential direction of the tracks.

A support plate 203 for supporting the objective lens 41 to be movable in a direction perpendicular to the surface of the recording medium 1 (a direction orthogonal to the plane of the drawing sheet of FIG. 2) is attached to the second movable portion 202. The optical head 11 also has an actuator 231 for moving the objective lens 41 with respect to the second movable portion 202 in a direction perpendicular to the surface of the recording medium 1.

The mirror 40 is fixed to the first movable portion 201. Light that impinges on the mirror 36 from the convex lens 35 in FIG. 2 and is reflected by the same impinges on the mirror 40 shown in FIG. 3 and is reflected by the same. The light reflected by the mirror 40 is collected by the objective lens 41 and projected onto the recording medium 1. Light that impinges on the objective lens 41 from the recording medium 1 is collected by the objective lens 41, is reflected by the mirrors 40 and 36 in succession, and passes through the convex lenses 35 and 34 in succession.

According to the optical head 11 of this embodiment, the actuator 231 can change the position of the objective lens 41 in a direction perpendicular to the surface of the recording medium 1, thereby allowing focus servo. According to the optical head 11, the linear motors 212 can also change the position of the objective lens 41 in a radial direction of the recording medium 1, thereby allowing tracking servo. Furthermore, according to the optical head 11, the linear motors 222 can change the position of the objective lens 41 in a tangential direction of the tracks, i.e., in a direction generally along the tracks. This allows control of the irradiating position of the information light and the recording-specific reference light to follow the information recording areas 7. Access to a desired track is achieved by moving the spindle motor 82 in a horizontal direction with the slider 93.

The actuator 231 is driven by the focus servo circuit 86 shown in FIG. 6. The linear motors 212 are driven by the tracking servo circuit 87 shown in FIG. 6. The linear motors 222 are driven by the follow-up control circuit 94 shown in FIG. 6. The slider 93 is driven by the slide servo circuit 88 shown in FIG. 6.

The light source devices 12 and 45, the reflection type spatial light modulator 20, and the phase spatial light modulator 26 in the optical head 11 are controlled by the controller 90 shown in FIG. 6. The controller 90 holds information on a plurality of modulation patterns for spatially modulating the phase of light with the phase spatial light modulator 26. The operating portion 91 can select any one of the plurality of modulation patterns. Then, the controller 90 supplies the information on the modulation pattern selected by itself or by the operating portion 91 to the phase spatial light modulator 26 in accordance with predetermined conditions. In accordance with the information on the modulation pattern supplied by the controller 90, the phase spatial light modulator 26 spatially modulates the phase of light in the corresponding modulation pattern.

Now, an overview will be given of the operation of the optical system of the optical head 11 shown in FIG. 1 to FIG. 4. The light source device 12 emits S-polarized or P-polarized linear green light. The light emitted by the light source device 12 is collimated by the collimator lens 13 and reflected by the mirror 14. Then, the light is subjected to a 45° rotation of the direction of polarization through the half-wave plate 15, and thereby becomes light that contains both S-polarized components and P-polarized components. This light impinges on the polarization beam splitter 16. The P-polarized components of the light incident on the polarization beam splitter 16 pass through the polarization beam splitter surface 16a of the polarization beam splitter 16, while the S-polarized components are reflected by the polarization beam splitter surface 16a of the polarization beams splitter 16.

The P-polarized light having passed through the polarization beam splitter surface 16a is subjected to a 90° rotation of the direction of polarization through the half-wave plate 17, and becomes S-polarized light. This light is reflected by the polarization beam splitter surface 18a of the polarization beam splitter 18. Then, it passes through the quarter-wave plate 19 to become circularly polarized light, and impinges on the spatial light modulator 20. The light incident on the spatial light modulator 20 is spatially modulated in intensity by the spatial light modulator 20, and exits the spatial light modulator 20 as information light. The information light that has exited the spatial light modulator 20 passes through the quarter-wave plate 19 to become P-polarized light, and then passes through the polarization beam splitter surface 18a of the polarization beam splitter 18. This light passes through the half-wave plate 21 to become S-polarized light. This light passes through the convex lens 22, the pin hole 23, and the convex lens 24 in succession, impinges on the polarization beam splitter 25, and is reflected by the polarization beam splitter surface 25a to impinge on the shortwave pass filter 31.

Meanwhile, the S-polarized light reflected by the polarization beam splitter surface 16a impinges on the phase spatial light modulator 26. The phase spatial light modulator 26 spatially modulates the phase of light by setting the phase of the outgoing light pixel by pixel to either of two values differing by π (rad) from each other, for example. The light modulated by the phase spatial light modulator 26 becomes recording-specific reference light or reproduction-specific reference light. The light that has exited the phase spatial light modulator 26 impinges on the polarization beam splitter 27 and is reflected by the polarization beam splitter surface 27a. This light is subjected to a 45° rotation of the direction of polarization through the half-wave plate 28, and then passes through the convex lenses 29 and 30 to impinge on the polarization beam splitter 25. Part of this light passes through the polarization beam splitter surface 25a to impinge on the shortwave pass filter 31.

The light exiting the polarization beam splitter 25 to impinge on the shortwave pass filter 31 is the information light, the recording-specific reference light, or the reproduction-specific reference light. The light is green light. The light passes through the shortwave pass filter 31 and the two-way split optical rotation plate 32, is reflected by the dichroic mirror 33, and passes through the convex lenses 34 and 35 in succession. The light is then reflected by the mirrors 36 and 40 in succession, collected by the objective lens 41 and projected onto the recording medium 1. In this embodiment, as will be detailed later, the information light, the recording-specific reference light, and the reproduction-specific reference light, which are green light, are coaxially projected onto one side of the information recording layer 3 of the recording medium 1 so as to converge to a minimum diameter at an identical position located off the reflecting surface 5a.

Return light from the recording medium 1 corresponding to the green light projected onto the recording medium 1 is collimated or roughly collimated by the objective lens 41. The resulting light passes through the mirrors 40 and 36, the convex lenses 35 and 34, the dichroic mirror 33, the two-way split optical rotation plate 32, and the shortwave pass filter 31 to impinge on the polarization beam splitter 25. As will be detailed later, the light impinging on the polarization beam splitter 25 includes S-polarized light and P-polarized light. Of these, the S-polarized light is reflected by the polarization beam splitter surface 25a, while the P-polarized light passes through the polarization beam splitter surface 25a. The P-polarized light having passed through the polarization beam splitter surface 25a passes through the convex lenses 30 and 29, and is subjected to a 45° rotation of the direction of polarization through the half-wave plate 28. Then, the light impinges on the polarization beam splitter 27. Part of this light passes through the polarization beam splitter surface 27a and through the imaging lenses 37 and 38 to impinge on the solid state image pick-up device 39.

Meanwhile, red light emitted by the light source device 45 is collimated by the collimator lens 44 and then impinges on the beam splitter 43. A part of the light incident on the beam splitter 43 is reflected by the semi-reflecting surface 43a to impinge on the photodetector 46, while the other part of the light passes through the semi-reflecting surface 43a. The light having passed through the semi-reflecting surface 43a becomes position-controlling light. The position-controlling light passes through the red transmission filter 42 and the dichroic mirror 33 in succession, and further passes through the convex lenses 34 and 35 in succession. The light is then reflected by the mirrors 36 and 40 in succession, collected by the objective lens 41, and is projected onto the recording medium 1. In this embodiment, as will be detailed later, the position-controlling light, which is red light, is projected onto the recording medium 1 such that it converges to a minimum diameter on the reflecting surface 5a of the recording medium 1.

Return light from the recording medium 1 corresponding to the red light projected onto the recording medium 1 is collimated by the objective lens 41 and passes through the mirrors 40 and 36 and the convex lenses 35 and 34 to impinge on the dichroic mirror 33. This light passes through the dichroic mirror 33 and the red transmission filter 42 in succession, and then impinges on the beam splitter 43. Part of the light incident on the beam splitter 43 is reflected by the semi-reflecting surface 43a and passes through the convex lens 47 and the cylindrical lens 48 in succession. Then, it is detected by the four-way split photodetector 49. Based on the output of the four-way split photodetector 49, the detection circuit 85 generates a focus error signal FE, a tracking error signal TE, and a reproduction signal RF. Based on these signals, focus servo and tracking servo for controlling the position of the information light, the recording-specific reference light, and the reproduction-specific reference light with respect to the recording medium 1 are performed, along with reproduction of the basic clock and determination of addresses. The four-way split photodetector 49 corresponds to the position-controlling information generator of the invention. The output of the four-way split photodetector 49 corresponds to the position-controlling information of the invention. The detection circuit 85, the focus servo circuit 86, the tracking servo circuit 87, and the actuator in the optical head 11 correspond to the position controller of the invention.

Figure 7:
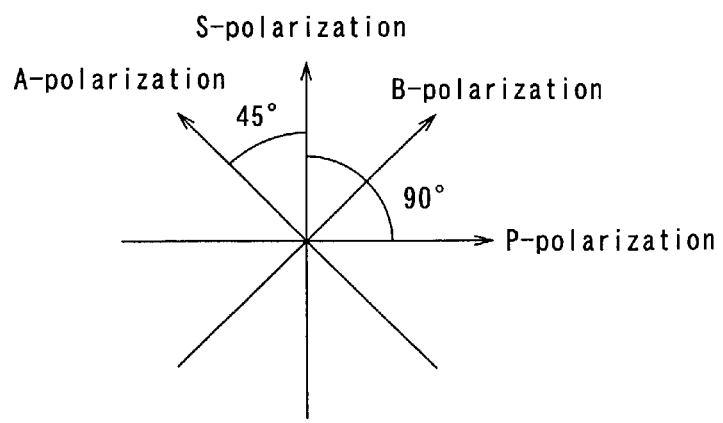
FIG. 7 is an explanatory diagram for explaining polarized light used in the first embodiment of the invention.

Now, with reference to FIG. 7, definitions will be given to terms "A-polarized light" and "B-polarized light" which will be used later in this specification. As shown in FIG. 7, A-polarized light is linear polarized light obtained by rotating the direction of polarization of the S-polarized light by −45° or by rotating the direction of polarization of the P-polarized light by +45°, while B-polarized light is linear polarized light obtained by rotating the direction of polarization of the S-polarized light by +45° or by rotating the direction of polarization of the P-polarized light by −45°. The directions of polarization of the A-polarized light and B-polarized light are orthogonal to each other.

Servo, information recording, and information reproducing operations of the optical information recording/reproducing apparatus according to the embodiment will now be separately described in that order. The following description also serves to describe the optical information recording method, the optical information reproducing method, and the optical information recording/reproducing method according to the embodiment.

Figure 8:
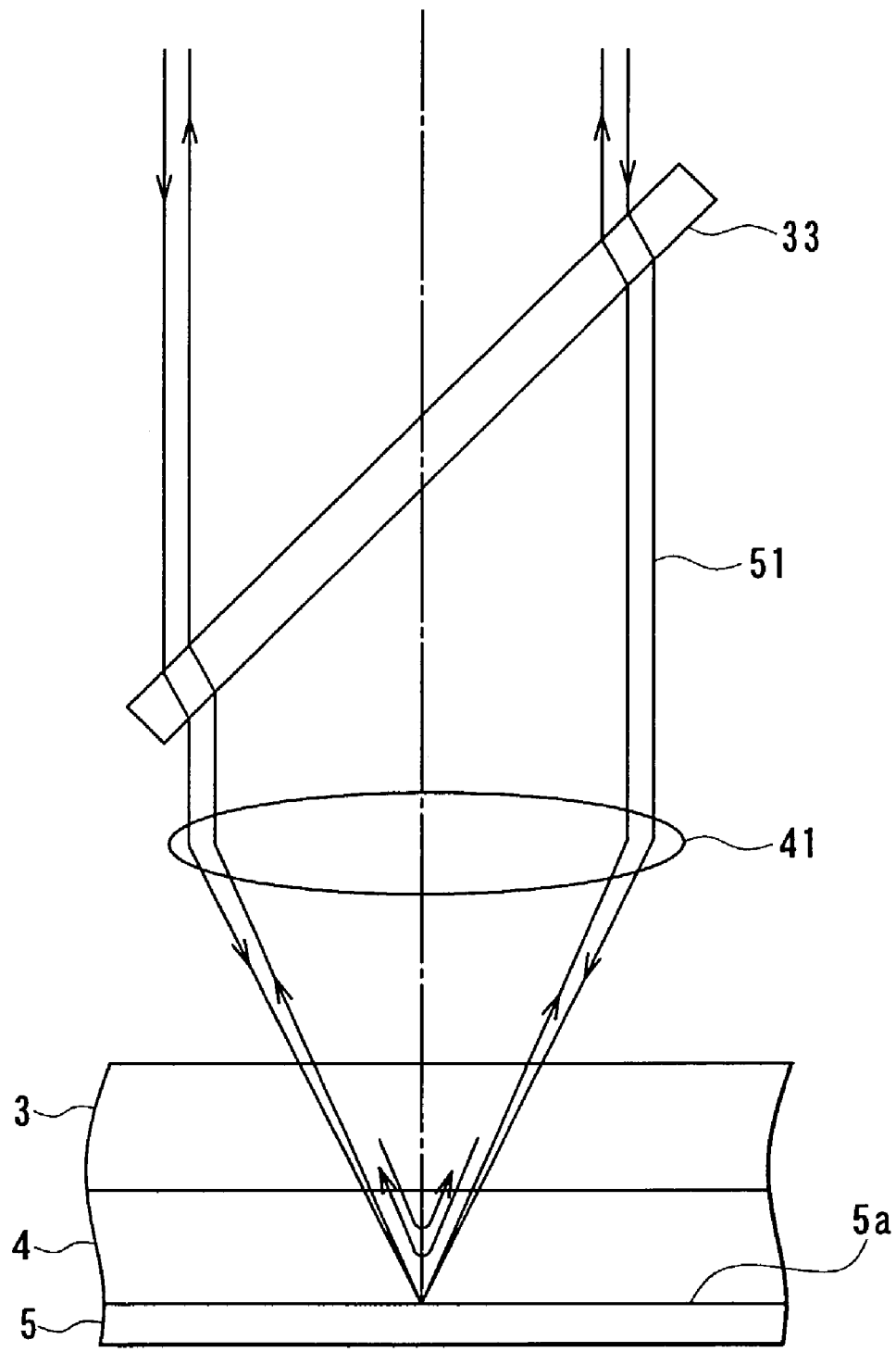
FIG. 8 is an explanatory diagram for explaining a servo operation of the optical information recording/reproducing apparatus according to the first embodiment of the invention.

The servo operation will now be described with reference to FIG. 8. FIG. 8 is an explanatory diagram showing the state of light during the servo operation. For optical parts, FIG. 8 shows the dichroic mirror 33 and the objective lens 41 alone. In the servo operation, the light source device 45 emits red light. The light source device 12 emits no green light. As previously described, the position-controlling light 51 that is emitted by the light source device 45 passes through the collimator lens 44, the beam splitter 43, the red transmission filter 42, the dichroic mirror 33, the convex lenses 34 and 35, and the mirrors 36 and 40, and is projected onto the recording medium 1 from the objective lens 41. The position-controlling light 51 is reflected by the reflecting surface 5a of the recording medium 1, passes through the objective lens 41, the mirrors 40 and 36, the convex lenses 35 and 34, the dichroic mirror 33, the red transmission filter 42, the beam splitter 43, the convex lens 47, and the cylindrical lens 48, and is detected by the four-way split photodetector 49. Based on the output of the four-way split photodetector 49, the detection circuit 85 generates a focus error signal FE, a tracking error signal TE, and a reproduction signal RF. Based on these signals, focus servo and tracking servo are performed, along with reproduction of the basic clock and determination of addresses. In this embodiment, focus servo is performed such that the position-controlling light 51 converges to a minimum diameter on the reflecting surface 5a of the recording medium 1.

The controller 90 predicts the timing at which light that has exited the objective lens 41 passes through the address servo areas 6 based on the basic clock reproduced from the reproduction signal RF, and maintains the foregoing setting during the period in which the light that has exited the objective lens 41 passes through the address servo areas 6.

Figure 9:
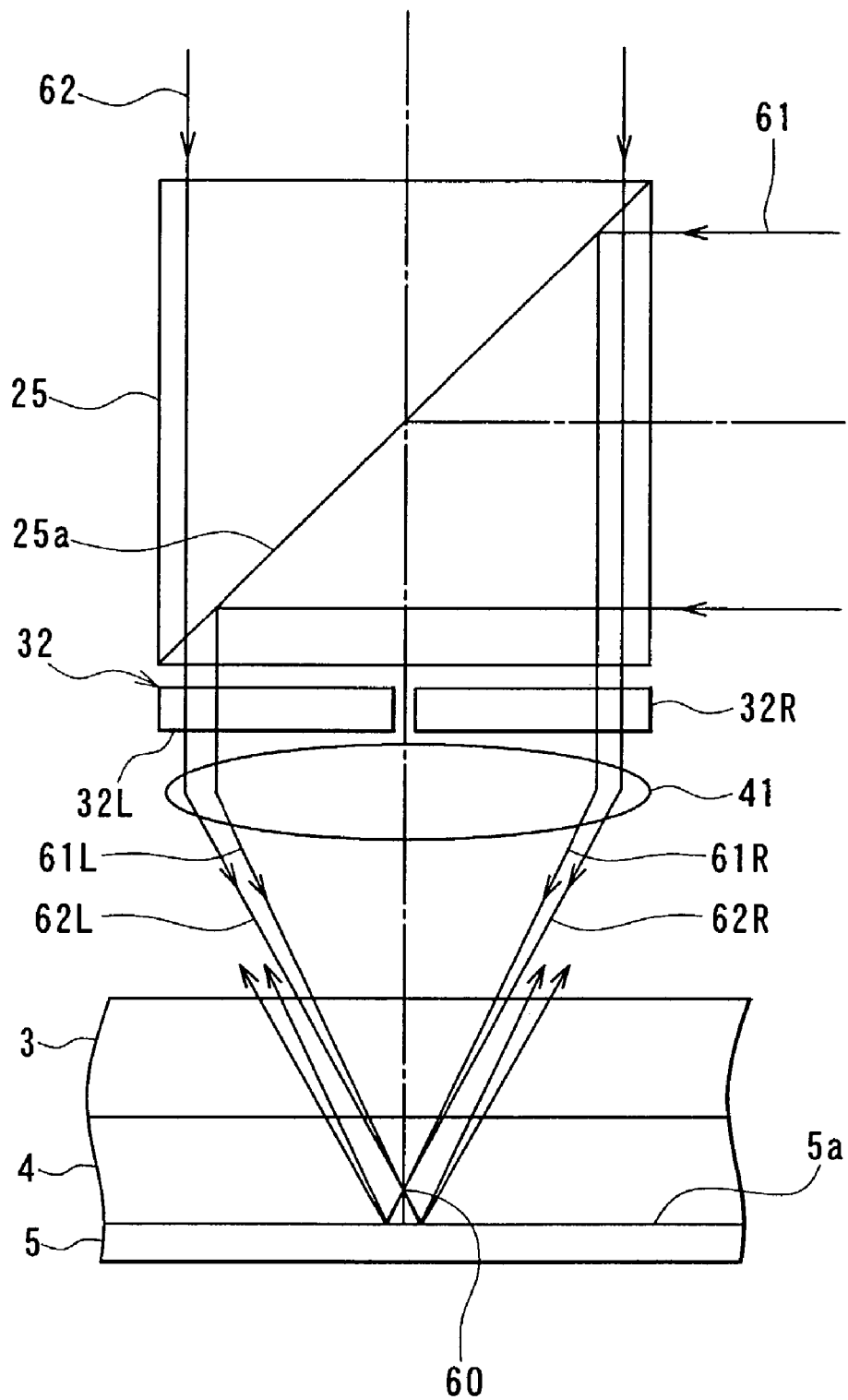
FIG. 9 is an explanatory diagram for explaining a recording operation of the optical information recording/reproducing apparatus according to the first embodiment of the invention.

The information recording operation will now be described with reference to FIG. 9. FIG. 9 is an explanatory diagram showing the state of light during the information recording operation. For optical parts, FIG. 9 shows the polarization beam splitter 25, the two-way split optical rotation plate 32, and the objective lens 41 alone.

In the information recording operation, the light source device 12 emits green light. The light source device 45 emits no red light. Under the control of the controller 90, the output of the light emitted by the light source device 12 is set to a high level suitable for recording over a given period of time. Neither focus servo nor tracking servo is performed during the period in which the light that has exited the objective lens 41 passes through areas other than the address servo areas 6. During that period, the objective lens 41 is fixed at a position determined by the previously-performed focus servo and tracking servo.

The light emitted by the light source device 12 is divided into two beams by the polarization beam splitter 16. One of the beams is modulated by the spatial light modulator 20 to become information light 61. The other of the beams is modulated by the phase spatial light modulator 26 to become recording-specific reference light 62. The information light 61 and the recording-specific reference light 62 are combined by the polarization beam splitter 25 to impinge on the two-way split optical rotation plate 32. Before the impingement on the two-way split optical rotation plate 32, the information light 61 is S-polarized light while the recording-specific reference light 62 is P-polarized light.

The information light 61R that has passed through the optical rotation plate 32R of the two-way split optical rotation plate 32 becomes A-polarized light, while the information light 61L that has passed through the optical rotation plate 32L of the two-way split optical rotation plate 32 becomes B-polarized light. On the other hand, the recording-specific reference light 62R that has passed through the optical rotation plate 32R of the two-way split optical rotation plate 32 becomes B-polarized light, while the recording-specific reference light 62L that has passed through the optical rotation plate 32L of the two-way split optical rotation plate 32 becomes A-polarized light.

The information light 61L, 61R and the recording-specific reference light 62L, 62R that have passed through the two-way split optical rotation plate 32 are collected by the objective lens 41 and coaxially projected onto the same side of the recording medium 1. In this embodiment, as mentioned above, the position-controlling light 51 converges to a minimum diameter on the reflecting surface 5a of the recording medium 1. It should be noted here that the wavelength of each of the information light 61L, 61R and the recording-specific reference light 62L, 62R is shorter than that of the position-controlling light 51. Consequently, as shown in FIG. 9, the information light 61L, 61R and the recording-specific reference light 62L, 62R converge to a minimum diameter at an identical position 60 located off the reflecting surface 5a toward the information recording layer 3, due to chromatic aberration of the objective lens 41. This position 60 falls between the reflecting surface 5a and the information recording layer 3.

The information light 61R that impinges on the recording medium 1 after having passed through the optical rotation plate 32R is A-polarized light. The recording-specific reference light 62L that impinges on the recording medium 1 after having passed through the optical rotation plate 32L is also A-polarized light. The A-polarized recording-specific reference light 62L is reflected by the reflecting surface 5a of the recording medium 1, and passes through the same area in the information recording layer 3 as the A-polarized information light 61R yet to be reflected by the reflecting surface 5a does. The light 62L and the light 61R interfere with each other to form an interference pattern because their directions of polarization coincide with each other. On the other hand, the A-polarized information light 61R is reflected by the reflecting surface 5a of the recording medium 1, and passes through the same area in the information recording layer 3 as the A-polarized recording-specific reference light 62L yet to be reflected by the reflecting surface 5a does. The light 62L and the light 61R also interfere with each other to form an interference pattern because their directions of polarization coincide with each other. Thus, the interference pattern resulting from the interference between the A-polarized information light 61R yet to impinge on the reflecting surface 5a and the A-polarized recording-specific reference light 62L reflected by the reflecting surface 5a, and the interference pattern resulting from the interference between the A-polarized recording-specific reference light 62L yet to impinge on the reflecting surface 5a and the A-polarized information light 61R reflected by the reflecting surface 5a, are volumetrically recorded in the information recording layer 3.

Likewise, The information light 61L that impinges on the recording medium 1 after having passed through the optical rotation plate 32L is B-polarized light. The recording-specific reference light 62R that impinges on the recording medium 1 after having passed through the optical rotation plate 32R is also B-polarized light. The B-polarized recording-specific reference light 62R is reflected by the reflecting surface 5a of the recording medium 1, and passes through the same area in the information recording layer 3 as the B-polarized information light 61L yet to be reflected by the reflecting surface 5a does. The light 61L and the light 62R interfere with each other to form an interference pattern because their directions of polarization coincide with each other. On the other hand, the B-polarized information light 61L is reflected by the reflecting surface 5a of the information recording medium 1, and passes through the same area in the information recording layer 3 as the B-polarized recording-specific reference light 62R yet to be reflected by the reflecting surface 5a does. The light 61L and the light 62R also interfere with each other to form an interference pattern because their directions of polarization coincide with each other. Thus, the interference pattern resulting from the interference between the B-polarized information light 61L yet to impinge on the reflecting surface 5a and the B-polarized recording-specific reference light 62R reflected by the reflecting surface 5a, and the interference pattern resulting from the interference between the B-polarized recording-specific reference light 62R yet to impinge on the reflecting surface 5a and the B-polarized information light 61L reflected by the reflecting surface 5a, are volumetrically recorded in the information recording layer 3.

The information light 61R that has passed through the optical rotation plate 32R and the information light 61L that has passed through the optical rotation plate 32L do not interfere with each other because they differ in direction of polarization by 90°. Likewise, the recording-specific reference light 62R that has passed through the optical rotation plate 32R and the recording-specific reference light 62L that has passed through the optical rotation plate 32L do not interfere with each other because they differ in direction of polarization by 90°.

According to this embodiment, it is possible to record a plurality of pieces of information in an identical location of the information recording layer 3 on a multiplex basis through phase-encoding multiplexing by changing the modulation pattern of the phase of the recording-specific reference light for each piece of the information to be recorded.

Figure 10:
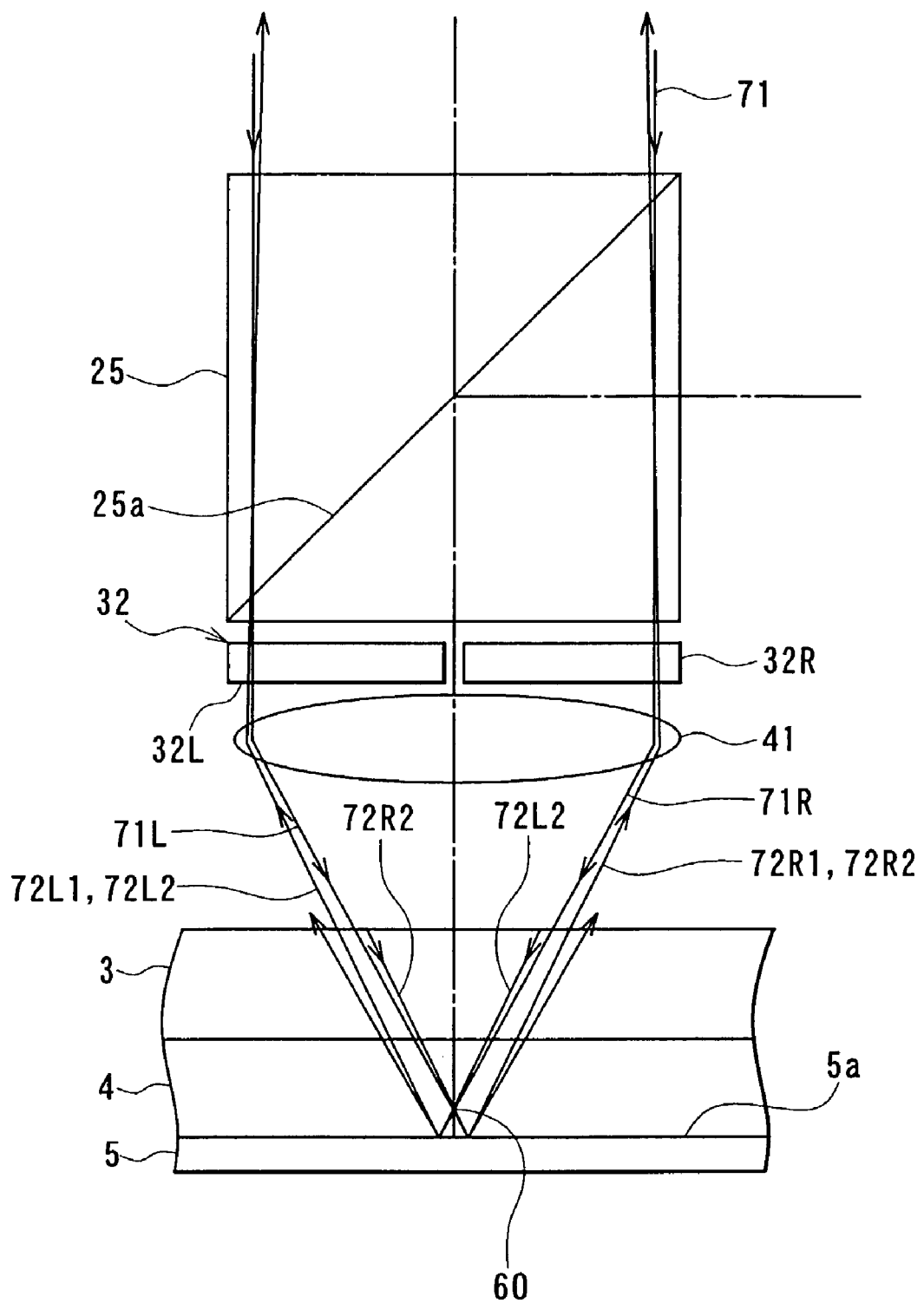
FIG. 10 is an explanatory diagram for explaining a reproducing operation of the optical information recording/reproducing apparatus according to the first embodiment of the invention.

The information reproducing operation will now be described with reference to FIG. 10. FIG. 10 is an explanatory diagram showing a state of light during the reproducing operation.

In the information reproducing operation, the light source device 12 emits green light. The light source device 45 emits no red light. Under the control of the controller 90, the output of the light emitted by the light source device 12 is set to a low level suitable for reproduction. Neither focus servo nor tracking servo is performed during the period in which the light that has exited the objective lens 41 passes areas other than the address servo areas 6. During that period, the objective lens 41 is fixed at a position determined by the previously-performed focus servo and tracking servo.

In the spatial light modulator 20, all the pixels are brought into a light-blocking state. The light emitted by the light source device 12 is divided into two beams by the polarization beam splitter 16. One of the beams is blocked by the spatial light modulator 20. The other of the beams is modulated by the phase spatial light modulator 26 into reproduction-specific reference light 71. The reproduction-specific reference light 71 passes through the polarization beam splitter 25 to impinge on the two-way split optical rotation plate 32. Before impinging on the two-way split optical rotation plate 32, the reproduction-specific reference light 71 is P-polarized light.

The reproduction-specific reference light 71R that has passed through the optical rotation plate 32R of the two-way split optical rotation plate 32 becomes B-polarized light, while the reproduction-specific reference light 71L that has passed through the optical rotation plate 32L of the two-way split optical rotation plate 32 becomes A-polarized light.

The reproduction-specific reference light 71L, 71R having passed through the two-way split optical rotation plate 32 is collected by the objective lens 41 and projected onto the recording medium 1. As previously mentioned, the position-controlling light 51 converges to a minimum diameter on the reflecting surface 5a of the recording medium 1. The wavelength of the reproduction-specific reference light 71L, 71R is the same as that of the information light 61L, 61R and the recording-specific reference light 62L, 62R at the time of recording information, that is, shorter than the wavelength of the position-controlling light 51. Consequently, as shown in FIG. 10, the reproduction-specific reference light 71L, 71R converges to a minimum diameter at the same position where the information light 61L, 61R and the recording-specific reference light 62L, 62R converge to a minimum diameter, i.e., at the position 60 located off the reflecting surface 5a toward the information recording layer 3, due to chromatic aberration of the objective lens 41.

The reproduction-specific reference light 71R that impinges on the recording medium 1 after having passed through the optical rotation plate 32R is B-polarized light. The reproduction-specific reference light 71L that impinges on the recording medium 1 after having passed through the optical rotation plate 32L is A-polarized light.

In the information recording layer 3, the reproduction-specific reference light 71R yet to be reflected by the reflecting surface 5a causes reproduction light 72R1 that travels away from the reflecting surface 5a, while the reproduction-specific reference light 71R reflected by the reflecting surface 5a causes reproduction light 72R2 that travels toward the reflecting surface 5a. The reproduction light 72R1 exits as-is from the recording medium 1. The reproduction light 72R2 is reflected by the reflecting surface 5a and then exits the recording medium 1. Each of the reproduction light 72R1 and 72R2 has a wavefront equivalent to that of light emitted from a position symmetrical to the position 60 about the reflecting surface 5a. Thus, the reproduction light 72R1, 72R2 passes through the objective lens 41 to become slightly converging light, and impinges on the optical rotation plate 32R of the two-way split optical rotation plate 32. The reproduction light 72R1, 72R2 is B-polarized light before impinging on the optical rotation plate 32R, and becomes P-polarized light after passing through the optical rotation plate 32R. Thus, the reproduction light 72R1, 72R2 passes through the polarization beam splitter surface 25a of the polarization beam splitter 25.

In the information recording layer 3, the reproduction-specific reference light 71L yet to be reflected by the reflecting surface 5a causes reproduction light 72L1 that travels away from the reflecting surface 5a, while the reproduction-specific reference light 71L reflected by the reflecting surface 5a causes reproduction light 72L2 that travels toward the reflecting surface 5a. The reproduction light 72L1 exits as-is from the recording medium 1. The reproduction light 72L2 is reflected by the reflecting surface 5a and then exits the recording medium 1. Each of the reproduction light 72L1 and 72L2 has a wavefront equivalent to that of light emitted from a position symmetrical to the position 60 about the reflecting surface 5a. Thus, the reproduction light 72L1, 72L2 passes through the objective lens 41 to become slightly converging light, and impinges on the optical rotation plate 32L of the two-way split optical rotation plate 32. The reproduction light 72L1, 72L2 is A-polarized light before impinging on the optical rotation plate 32L, and becomes P-polarized light after passing through the optical rotation plate 32L. Thus, the reproduction light 72L1, 72L2 passes through the polarization beam splitter surface 25a of the polarization beam splitter 25.

The reproduction light having passed through the two-way split optical rotation plate 32 thus becomes P-polarized light over the entire cross section of the beam thereof. The reproduction light having passed through the two-way split optical rotation plate 32 impinges on the solid state image pick-up device 39. The imaging lenses 37 and 38 form the image carried by the reproduction light on the solid state image pick-up device 39.

On the solid state image pick-up device 39, formed is an image of the intensity pattern of the light caused by the spatial light modulator 20 in the recording operation, so that information is reproduced by detecting this pattern. When a plurality of pieces of information are recorded in the information recording layer 3 on a multiplex basis by changing modulation patterns of the recording-specific reference light, among the plurality of pieces of information, the one corresponding to the modulation pattern of the reproduction-specific reference light is only reproduced.

The reproduction-specific reference light 71R incident on the recording medium 1 after having passed through the optical rotation plate 32R is reflected by the reflecting surface 5a and exits the recording medium 1. The light then passes through the optical rotation plate 32L and is converted into S-polarized return light. On the other hand, the reproduction-specific reference light 71L incident on the recording medium 1 after having passed through the optical rotation plate 32L is reflected by the reflecting surface 5a and exits the recording medium 1. The light then passes through the optical rotation plate 32R and is converted into S-polarized return light. Thus, the return light having passed through the two-way split optical rotation plate 32 becomes S-polarized light over the entire cross section of the beam thereof. Since the return light is reflected by the polarization beam splitter surface 25a of the polarization beam splitter 25, it does not impinge on the solid state image pick-up device 39.

If the information light and the recording-specific reference light are projected onto the recording medium 1 so as to converge to a minimum diameter on the reflecting surface 5a to thereby record information in the information recording layer 3, the same pattern as that of the information light used for recording and a mirror pattern of the same occur simultaneously from the information recording layer 3 during reproduction when the reproduction-specific reference light is projected onto the recording medium 1 so as to converge to a minimum diameter on the reflecting surface 5a. The reason for this is as follows. At the time of reproduction, the reproduction-specific reference light yet to be reflected by the reflecting surface 5a and the reproduction-specific reference light reflected by the reflecting surface 5a have the same wavefront, and therefore two beams of reproduction light having the same pattern are generated from an identical area in the information recording layer 3 in directions away from the reflecting surface 5a and toward the reflecting surface 5a.

In contrast, in this embodiment, the information light, the recording-specific reference light, and the reproduction-specific reference light all converge to a minimum diameter at the identical position 60 located off the reflecting surface 5a. Consequently, at the time of reproduction, the reproduction-specific reference light yet to be reflected by the reflecting surface 5a and the reproduction-specific reference light reflected by the reflecting surface 5a will not have the same wavefront. Therefore, according to the embodiment, during reproduction it is possible to prevent the simultaneous occurrence of the same pattern as that of the information light used for recording and a mirror pattern of the same.

In this embodiment, the information light, the recording-specific reference light, and the reproduction-specific reference light converge to a minimum diameter at the identical position 60. This eliminates the need for a specific optical system for making the information light to converge to a position different from the converging position of the recording-specific reference light and the reproduction-specific reference light.

Figure 11:
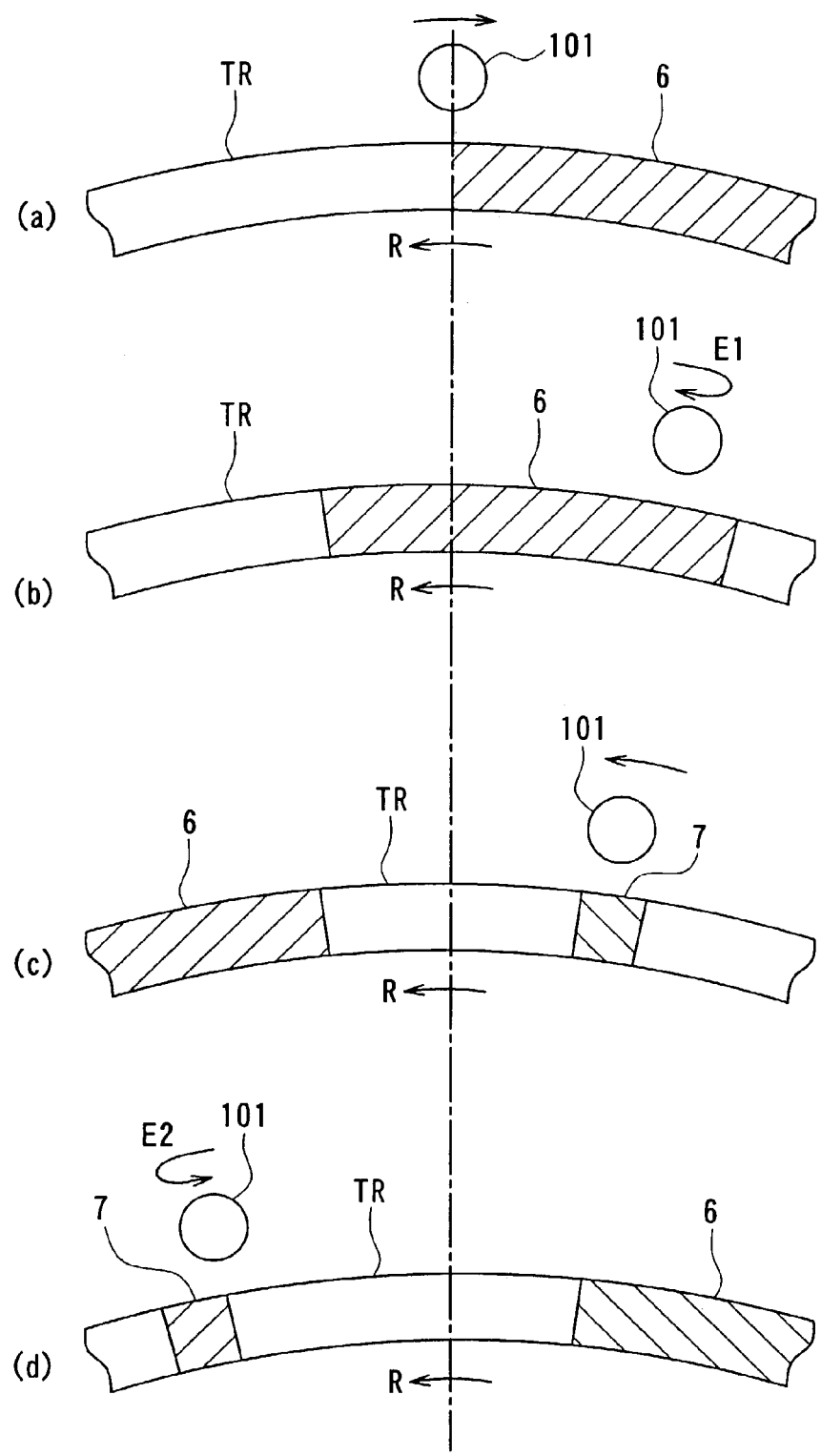
FIG. 11 is an explanatory diagram for explaining how a track and the irradiating position of information light and recording-specific reference light move during the information recording operation of the optical information recording/reproducing apparatus according to the first embodiment of the invention.

Now, with reference to FIG. 11, description will now be given of the operation of the optical head 11 at the time of recording information. FIG. 11 shows how a track TR and an irradiating position 101 of the information light and the recording-specific reference light move during information recording. In FIG. 11, the symbol R represents the moving direction of the recording medium 1. Although for the sake of convenience FIG. 11 shows the irradiating position 101 so as not to fall on the track TR, in fact the irradiating position 101 falls on the track TR.

In this embodiment, as shown in FIG. 11(a), the irradiating position 101 is moved off the neutral position in a direction (hereinafter referred to as leading direction) that is opposite to the moving direction R of the recording medium 1 before information is recorded in an information recording area 7 of the recording medium 1. Then, the irradiating position 101 passes through an address servo area 6, and the information recorded in the address servo area 6 is detected by the optical head 11.

Next, as shown in FIG. 11(b), when the irradiating position 101 has reached the end E1 of its moving range in the leading direction, the irradiating position 101 is then moved in the moving direction R of the recording medium 1 (hereinafter referred to as lagging direction). Immediately after the start of movement of the irradiating position 101 in the lagging direction, the moving speed of the irradiating position 101 is lower than the moving speed of a desired information recording area 7 in which information is to be recorded. Hence, the irradiating position 101 finally overlaps the desired information recording area 7.

As shown in FIG. 11(c), when the irradiating position 101 overlaps the desired information recording area 7, the moving speed of the irradiating position 101 is adjusted to become equal to the moving speed of the information recording area 7. Consequently, the irradiating position 101 is moved so as to follow the desired information recording area 7.

As shown in FIG. 11(d), when the irradiating position 101 has reached the end E2 of its moving range in the lagging direction, the irradiating position 101 is then moved in the leading direction again to perform the operation shown in FIG. 11(a). In this way, the operations shown in FIGS. 11(a)–(d) are repeated.

As described above, in this embodiment, the irradiating position 101 of the information light and the recording-specific reference light is moved so as to follow a single moving information recording area 7 for a predetermined period. Consequently, the single information recording area 7 is kept being irradiated with the information light and the recording-specific reference light over the predetermined period. Information is thereby recorded in this information recording area 7 in the form of an interference pattern resulting from interference between the information light and the recording-specific reference light.

As described in the foregoing, according to this embodiment, to record information, the information light and the recording-specific reference light are projected coaxially onto one side of the information recording layer 3 such that they converge to a minimum diameter at the identical position 60 located off the reflecting surface 5a.

Furthermore, to record information, each of the recording-specific reference light having a first direction of polarization (P-polarized) and the information light having a second direction of polarization (S-polarized) that is different from the first direction of polarization (P-polarized) is optically rotated by the two-way split optical rotation plate 32 serving as the optical rotator in directions different between respective half areas of the cross section of the beam thereof. As a result, for each of the information light and the recording-specific reference light, the direction of polarization is set to be different between the respective half areas of the cross section of the beam thereof such that the direction of polarization of the information light yet to impinge on the reflecting surface 5a coincides with that of the recording-specific reference light reflected by the reflecting surface 5a, and the direction of polarization of the recording-specific reference light yet to impinge on the reflecting surface 5a coincides with that of the information light reflected by the reflecting surface 5a in an identical area in the information recording layer 3. As a result, in the information recording layer 3, an interference pattern resulting from interference between the information light yet to impinge on the reflecting surface 5a and the recording-specific reference light reflected by the reflecting surface 5a is recorded, and also an interference pattern resulting from interference between the recording-specific reference light yet to impinge on the reflecting surface 5a and the information light reflected by the reflecting surface 5a is recorded.

On the other hand, to reproduce information, the reproduction-specific reference light is projected onto the information recording layer 3 so as to converge to a minimum diameter at the same position where the information light and the recording-specific reference light converge to a minimum diameter. During information reproduction, the projection of the reproduction-specific reference light and the collection of the reproduction light are performed on one side of the information recording layer 3, and the reproduction-specific reference light and the reproduction light are arranged coaxially.

Furthermore, to reproduce information, the reproduction-specific reference light having the first direction of polarization (P-polarized) is optically rotated by the two-way split optical rotation plate 32 in directions different between respective half areas of the cross section of the beam thereof, converted into reproduction-specific reference light having different directions of polarization for the respective half areas, and projected onto the information recording layer 3.

Then, reproduction light and return light resulting from the reproduction-specific reference light reflected by the reflecting surface 5a are each optically rotated by the two-way split optical rotation plate 32 in directions different between the respective half areas, and thereby converted into reproduction light having the first direction of polarization (P-polarized) over the entire cross section of the beam thereof and return light having the second direction of polarization (S-polarized) over the entire cross section of the beam thereof. It is thereby possible to separate the reproduction light and the return light from each other by the polarization beam splitter 25 serving as the polarization separator, and consequently, it is possible to improve the SN ratio of the reproduced information.

According to the embodiment, the information light can carry information using the entire cross section of the beam thereof. Likewise, the reproduction light can also carry information using the entire cross section of the beam thereof.

From the foregoing, the embodiment makes it possible to record and reproduce information through the use of holography and to achieve a compact configuration of the optical system for recording and reproduction without causing a reduction in the amount of information.

According to this embodiment, all of the information light, the recording-specific reference light and the reproduction-specific reference light converge to a minimum diameter on the identical position 60 located off the reflecting surface 5a. Therefore, according to the embodiment, during reproduction it is possible to prevent the simultaneous occurrence of the same pattern as that of the information light used for recording and a mirror pattern of the same.

In this embodiment, the information light, the recording-specific reference light, and the reproduction-specific reference light have a predetermined first wavelength, and the position-controlling light has a second wavelength different from the first wavelength. Then, in this embodiment, focus servo and tracking servo are performed such that the position-controlling light converges to a minimum diameter on the reflecting surface 5a of the recording medium 1 while the information light, the recording-specific reference light, and the reproduction-specific reference light converge to a minimum diameter at the identical position 60 located off the reflecting surface 5a because of the chromatic aberration of the objective lens 41. Therefore, according to the embodiment, it is possible to maintain a constant positional relationship between the position 60 and the information recording layer 3 in a direction of the thickness of the recording medium 1, and it is also possible to allow the irradiating position of the information light, the recording-specific reference light, and the reproduction-specific reference light to follow the tracks of the recording medium 1.

In this embodiment, the irradiating position of the information light and the recording-specific reference light is moved so as to follow a single moving information recording area 7 for a predetermined period. As a result, the single information recording area 7 is kept being irradiated with the information light and the recording-specific reference light over the predetermined period. Therefore, according to the embodiment, it is possible to irradiate the information recording areas 7 with the information light and the recording-specific reference light long enough to record information in the information recording areas 7 without causing a difference between the information recording areas 7 and the irradiating position of the information light and the recording-specific reference light. Consequently, according to the embodiment it is possible to record information in each of a plurality of information recording areas 7 through the use of holography with a semiconductor laser which is a practical light source, for example, while rotationally moving the recording medium 1 having the information recording areas 7.

Second Embodiment

Figure 12:
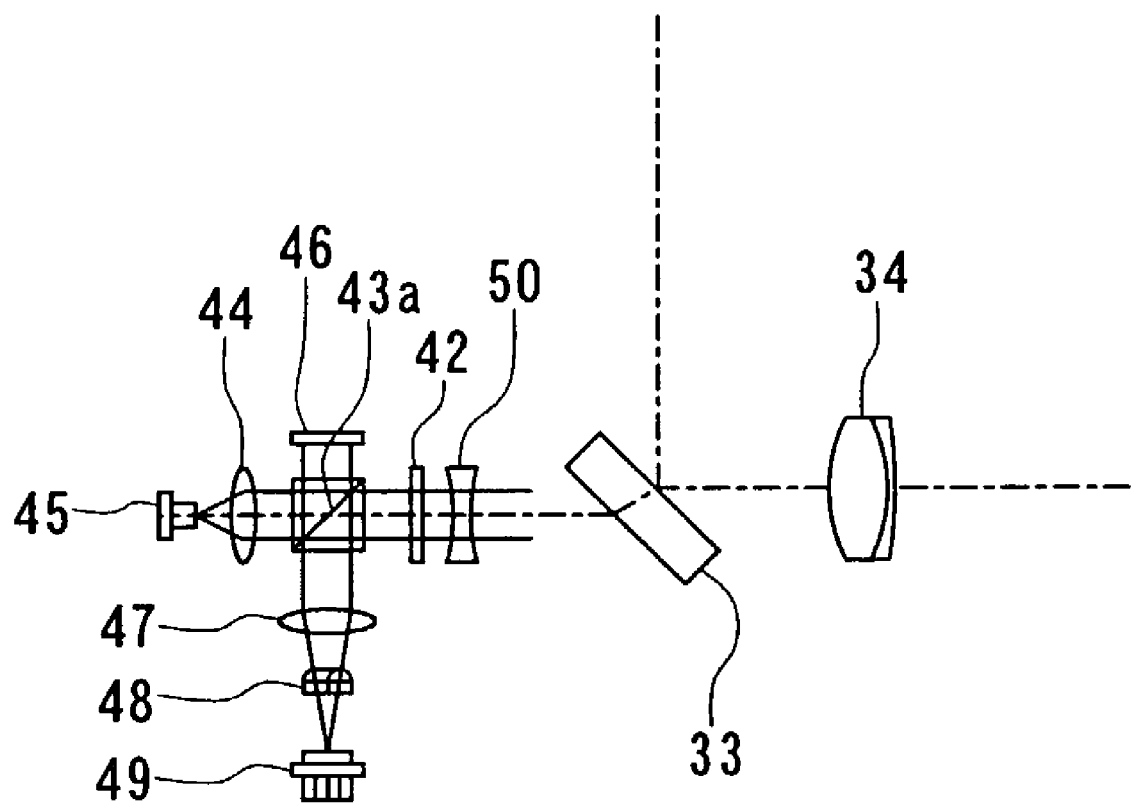
FIG. 12 is an explanatory diagram showing a position-controlling optical system of the optical head of an optical information recording/reproducing apparatus according to a second embodiment of the invention.

Now, with reference to FIG. 12, description will be given of an optical information recording/reproducing apparatus according to a second embodiment of the invention. FIG. 12 is an explanatory diagram showing the position-controlling optical system of an optical head of this embodiment. In this embodiment, as shown in FIG. 12, a concave lens 50 is provided between the dichroic mirror 33 and the red transmission filter 42.

In this embodiment, the position-controlling light emitted by the light source device 45 is collimated to impinge on the concave lens 50. The position-controlling light passes through the concave lens 50 to become slightly diverging light, which is collected by the objective lens 41 and projected onto the recording medium 1. In this embodiment, focus servo and tracking servo are performed such that the position-controlling light converges to a minimum diameter on the reflecting surface 5a of the recording medium 1 as in the first embodiment.

Meanwhile, the information light, the recording-specific reference light, and the reproduction-specific reference light are collimated to impinge on the objective lens 41, collected by the objective lens 41 and projected onto the recording medium 1. Thus, in this embodiment, when the position-controlling light converges to a minimum diameter on the reflecting surface 5a of the recording medium 1, the information light, the recording-specific reference light, and the reproduction-specific reference light converge at an identical position located off the reflecting surface 5a toward the information recording layer 3 without making use of the chromatic aberration of the objective lens 41.

The remainder of the configuration, operations, and effects of this embodiment are the same as those of the first embodiment.

The invention is not limited to the foregoing embodiments, and various modifications may be made thereto. For example, in the embodiments, the information light, the recording-specific reference light, and the reproduction-specific reference light are green light and the position-controlling light is red light. However, the information light, the recording-specific reference light, and the reproduction-specific reference light may be any light other than green light, and the position-controlling light may also be any light other than red light.

In the embodiments, information is recorded on a multiplex basis by phase-encoding multiplexing. However, the present invention also covers the case where multiplex recording by phase-encoding multiplexing is not conducted. In the embodiments, in the information recording operation, the irradiating position of the information light and the recording-specific reference light is controlled so as to follow a single moving information recording area 7 over a predetermined period. However, the invention also covers the case where no such control is exercised.

In the first embodiment, the information light, the recording-specific reference light, and the reproduction-specific reference light are allowed to converge at an identical position located off the reflecting surface 5a toward the information recording layer 3 by utilizing the chromatic aberration of a single lens. In the invention, however, the single lens may be replaced with an optical member that is designed to cause chromatic aberration deliberately through a combination of a plurality of lenses made of different glass materials.

As described in the foregoing, according to the optical information recording apparatus or the optical information recording method of the invention, the information light and the recording-specific reference light are projected coaxially onto one side of the information recording layer so as to converge to a minimum diameter at the identical position located off the reflecting surface. Furthermore, according to the invention, the information light can carry information using the entire cross section of the beam thereof. Furthermore, according to the invention, during reproduction it is possible to prevent the simultaneous occurrence of the same pattern as that of the information light used for recording and a mirror pattern of the same. The invention therefore makes it possible to record information through the use of holography and to achieve compact configuration of the optical system for recording without causing a reduction in the amount of information.

According to the optical information recording apparatus of the invention, position-controlling information may be generated by projecting the position-controlling light onto the recording medium such that it converges to a minimum diameter on the reflecting surface of the recording medium and receiving the position-controlling light reflected by the reflecting surface. Then, the position of the information light and the recording-specific reference light with respect to the recording medium may be controlled based on the position-controlling information. In this case, it is possible to maintain the information light and the recording-specific reference light in a constant positional relationship with the recording medium.

According to the optical information reproducing apparatus or the optical information reproducing method of the invention, the reproduction-specific reference light is projected onto the information recording layer so as to converge to a minimum diameter at the same position where the information light and the recording-specific reference light converge to a minimum diameter, that is, at the position located off the reflecting surface. Then, the reproduction light generated at the information recording layer is collected and detected. In the invention, the projection of the reproduction-specific reference light and the collection of the reproduction light are performed on one side of the information recording layer of the recording medium, and the reproduction-specific reference light and the reproduction light are arranged coaxially. Furthermore, according to the invention, the information light can carry information using the entire cross section of the beam thereof, and the reproduction light can also carry information using the entire cross section of the beam thereof. Furthermore, during reproduction it is possible to prevent the simultaneous occurrence of the same pattern as that of the information light used for recording and a mirror pattern of the same. The invention therefore makes it possible to reproduce information through the use of holography and to achieve compact configuration of the optical system for reproduction without causing a reduction in the amount of information.

In the optical information reproducing apparatus of the invention, position-controlling information may be generated by projecting the position-controlling light onto the recording medium such that it converges to a minimum diameter on the reflecting surface of the recording medium and receiving the position-controlling light reflected by the reflecting surface. Then, the position of the reproduction-specific reference light with respect to the recording medium may be controlled based on the position-controlling information. In this case, it is possible to maintain the reproduction-specific reference light in a constant positional relationship with the recording medium.

According to the optical information recording/reproducing apparatus or the optical information recording/reproducing method of the invention, it is possible to record and reproduce information through the use of holography and to achieve compact configuration of the optical system for recording and reproduction without causing a reduction in the amount of information, through the same operation as that of the optical information recording apparatus or method described above and the same operation as that of the optical information reproducing apparatus or method described above.

In the optical information recording/reproducing apparatus of the invention, position-controlling information may be generated by projecting the position-controlling light onto the recording medium such that it converges to a minimum diameter on the reflecting surface of the recording medium and receiving the position-controlling light reflected by the reflecting surface. Then, the position of the information light, the recording-specific reference light, and the reproduction-specific reference light with respect to the recording medium may be controlled based on the position-controlling information. In this case, it is possible to maintain the information light, the recording-specific reference light, and the reproduction-specific reference light in a constant positional relationship with the recording medium.

It is apparent from the foregoing description that the invention may be carried out in various modes and may be modified in various ways. It is therefore to be understood that within the scope of equivalence of the following claims the invention may be practiced in modes other than the foregoing embodiments.

What is claimed is:

1. An optical information recording apparatus for recording information in a recording medium having an information recording layer for information to be recorded in through the use of holography, one side of the information recording layer being irradiated with light for recording or reproducing information, and a reflecting surface being provided on the other side of the information recording layer, the apparatus comprising:
   an information light generator for generating information light that carries information;
   a recording-specific reference light generator for generating recording-specific reference light; and
   a recording optical system for irradiating the information recording layer with the information light generated by the information light generator and the recording-specific reference light generated by the recording-specific reference light generator such that the information is recorded in the information recording layer in the form of an interference pattern resulting from interference between the information light and the recording-specific reference light, wherein
   the recording optical system projects the information light and the recording-specific reference light coaxially onto the one side of the information recording layer such that the information light and the recording-specific reference light converge to a minimum diameter at an identical position located off the reflecting surface, and thereby records the information in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

2. An optical information recording apparatus according to claim 1, wherein the recording optical system causes each of the information light and the recording-specific reference light to have directions of polarization that are different between respective half areas of a cross section of a beam thereof such that the direction of polarization of the information light yet to impinge on the reflecting surface coincides with that of the recording-specific reference light reflected by the reflecting surface, and the direction of polarization of the recording-specific reference light yet to impinge on the reflecting surface coincides with that of the information light reflected by the reflecting surface in an identical area in the information recording layer.

3. An optical information recording apparatus according to claim 2, wherein the recording optical system has an optical rotator for optically rotating light passing therethrough in directions different between the respective areas, and optically rotates, with the optical rotator, each of the recording-specific reference light having a predetermined first direction of polarization and the information light having a second direction of polarization different from the first direction of polarization to cause each of the recording-specific reference light and the information light to have directions of polarization different between the respective areas.

4. An optical information recording apparatus according to claim 1, further comprising:
   a position-controlling information generator for generating position-controlling information by projecting position-controlling light onto the recording medium such that it converges to a minimum diameter on the reflecting surface and receiving the position-controlling light reflected by the reflecting surface, the position-controlling light being used to control the position of the information light and the recording-specific reference light with respect to the recording medium; and
   a position controller for controlling the position of the information light and the recording-specific reference light with respect to the recording medium based on the position-controlling information generated by the position-controlling information generator.

5. An optical information recording apparatus according to claim 4, wherein the information light and the recording-specific reference light have a predetermined first wavelength, and the position-controlling light has a second wavelength different from the first wavelength.

6. An optical information recording method for recording information in a recording medium having an information recording layer for information to be recorded in through the use of holography, one side of the information recording layer being irradiated with light for recording or reproducing information, and a reflecting surface being provided on the other side of the information recording layer, the method comprising:
   the step of generating information light that carries information;
   the step of generating recording-specific reference light; and
   the recording step in which the information recording layer is irradiated with the information light and the recording-specific reference light such that the information is recorded in the information recording layer in the form of an interference pattern resulting from interference between the information light and the recording-specific reference light, wherein
   in the recording step, the information light and the recording-specific reference light are projected coaxially onto the one side of the information recording layer such that the information light and the recording-specific reference light converge to a minimum diameter at an identical position located off the reflecting surface, and the information is thereby recorded in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface.

7. An optical information reproducing apparatus for reproducing information through the use of holography from a recording medium having an information recording layer for information to be recorded in through the use of holography, one side of the information recording layer being irradiated with light for recording or reproducing information, a reflecting surface being provided on the other side of the information recording layer, the information being recorded in the information recording layer based on information light and recording-specific reference light in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface, the information light and the recording-specific reference light being projected coaxially onto the one side of the information recording layer so as to converge to a minimum diameter at an identical position located off the reflecting surface, the apparatus comprising:
   a reproduction-specific reference light generator for generating reproduction-specific reference light;
   a reproducing optical system for irradiating the information recording layer with the reproduction-specific reference light generated by the reproduction-specific reference light generator and for collecting reproduction light generated at the information recording layer when irradiated with the reproduction-specific reference light; and
   a detector for detecting the reproduction light collected by the reproducing optical system, wherein
   the reproducing optical system projects the reproduction-specific reference light onto the information recording layer such that the reproduction-specific reference light converges to a minimum diameter at the same position where the information light and the recording-specific reference light converge to a minimum diameter, and performs the projection of the reproduction-specific reference light and the collection of the reproduction light on the one side of the information recording layer such that the reproduction-specific reference light and the reproduction light are arranged coaxially.

8. An optical information reproducing apparatus according to claim 7, wherein:

the reproducing optical system has an optical rotator for optically rotating light passing therethrough in directions different between respective half areas of a cross section of a beam of the light, and optically rotates, with the optical rotator, the reproduction-specific reference light having a predetermined first direction of polarization to convert the same into reproduction-specific reference light having directions of polarization different between the respective areas to irradiate the information recording layer therewith, and optically rotates, with the optical rotator, the reproduction light and return light resulting from the reproduction-specific reference light reflected by the reflecting surface to convert them into reproduction light having the first direction of polarization over an entire cross section of a beam thereof and return light having a second direction of polarization different from the first direction of polarization over an entire cross section of a beam thereof.

9. An optical information reproducing apparatus according to claim 8, wherein the reproducing optical system further has a polarization separator for separating the reproduction light having passed through the optical rotator and the return light having passed through the optical rotator from each other depending on a difference in direction of polarization.

10. An optical information reproducing apparatus according to claim 7, further comprising:

a position-controlling information generator for generating position-controlling information by projecting position-controlling light onto the recording medium such that it converges to a minimum diameter on the reflecting surface and receiving the position-controlling light reflected by the reflecting surface, the position-controlling light being used to control the position of the reproduction-specific reference light with respect to the recording medium; and a position controller for controlling the position of the reproduction-specific reference light with respect to the recording medium based on the position-controlling information generated by the position-controlling information generator.

11. An optical information reproducing apparatus according to claim 10, wherein the reproduction-specific reference light has a predetermined first wavelength, and the position-controlling light has a second wavelength different from the first wavelength.

12. An optical information reproducing method for reproducing information through the use of holography from a recording medium having an information recording layer for information to be recorded in through the use of holography, one side of the information recording layer being irradiated with light for recording or reproducing information, a reflecting surface being provided on the other side of the information recording layer, the information being recorded in the information recording layer based on information light and recording-specific reference light in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface, the information light and the recording-specific reference light being projected coaxially onto the one side of the information recording layer so as to converge to a minimum diameter at an identical position located off the reflecting surface, the method comprising:

the step of generating reproduction-specific reference light;

the reproducing step in which the information recording layer is irradiated with the reproduction-specific reference light generated by the reproduction-specific reference light generator, and reproduction light generated at the information recording layer when irradiated with the reproduction-specific reference light is collected; and the step of detecting the reproduction light, wherein in the reproducing step, the reproduction-specific reference light is projected onto the information recording layer so as to converge to a minimum diameter at the same position where the information light and the recording-specific reference light converge to a minimum diameter, and the projection of the reproduction-specific reference light and the collection of the reproduction light are performed on the one side of the information recording layer such that the reproduction-specific reference light and the reproduction light are arranged coaxially.

13. An optical information recording/reproducing apparatus for recording information in a recording medium having an information recording layer for information to be recorded in through the use of holography, one side of the information recording layer being irradiated with light for recording or reproducing information, and a reflecting surface being provided on the other side of the information recording layer, and for reproducing information from the recording medium, the apparatus comprising:

an information light generator for generating information light that carries information;

a recording-specific reference light generator for generating recording-specific reference light;

a reproduction-specific reference light generator for generating reproduction-specific reference light;

a recording/reproducing optical system for, to record information, irradiating the information recording layer with the information light generated by the information light generator and the recording-specific reference light generated by the recording-specific reference light generator such that information is recorded in the information recording layer in the form of an interference pattern resulting from interference between the information light and the recording-specific reference light, and, to reproduce information, irradiating the information recording layer with the reproduction-specific reference light generated by the reproduction-specific reference light generator and collecting reproduction light generated at the information recording layer when irradiated with the reproduction-specific reference light; and a detector for detecting the reproduction light collected by the recording/reproducing optical system, wherein:

to record information, the recording/reproducing optical system projects the information light and the recording-specific reference light coaxially onto the one side of the information recording layer such that the information light and the recording-specific reference light converge to a minimum diameter at an identical position located off the reflecting surface, and thereby records the information in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface, and to reproduce information, the recording/reproducing optical system projects the reproduction-specific reference light onto the information recording layer such that the reproduction-specific reference light converges to a minimum diameter at the same position where the information light and the recording-specific reference light converge to a minimum diameter, and performs the projection of the reproduction-specific reference light and the collection of the reproduction light on the one side of the information recording layer such that the reproduction-specific reference light and the reproduction light are arranged coaxially.

14. An optical information recording/reproducing apparatus according to claim 13, wherein:

the recording/reproducing optical system has an optical rotator for optically rotating light passing therethrough in directions different between respective half areas of a cross section of a beam of the light;

to record information, the recording/reproducing optical system optically rotates, with the optical rotator, each of the recording-specific reference light having a predetermined first direction of polarization and the information light having a second direction of polarization different from the first direction of polarization, and thereby causes each of the information light and the recording-specific reference light to have directions of polarization that are different between respective half areas of a cross section of a beam thereof such that the direction of polarization of the information light yet to impinge on the reflecting surface coincides with that of the recording-specific reference light reflected by the reflecting surface, and the direction of polarization of the recording-specific reference light yet to impinge on the reflecting surface coincides with that of the information light reflected by the reflecting surface in an identical area in the information recording layer; and to reproduce information, the recording/reproducing optical system optically rotates, with the optical rotator, the reproduction-specific reference light having the first direction of polarization to convert the same into reproduction-specific reference light having directions of polarization different between the respective areas to irradiate the information recording layer therewith, and optically rotates, with the optical rotator, the reproduction light and return light resulting from the reproduction-specific reference light reflected by the reflecting surface to convert them into reproduction light having the first direction of polarization over an entire cross section of a beam thereof and return light having a second direction of polarization different from the first direction of polarization over an entire cross section of a beam thereof.

15. An optical information recording/reproducing apparatus according to claim 14, wherein the recording/reproducing optical system further has a polarization separator for separating the reproduction light having passed through the optical rotator and the return light having passed through the optical rotator from each other depending on a difference in direction of polarization.

16. An optical information recording/reproducing apparatus according to claim 13, further comprising:

a position-controlling information generator for generating position-controlling information by projecting position-controlling light onto the recording medium such that it converges to a minimum diameter on the reflecting surface and receiving the position-controlling light reflected by the reflecting surface, the position-controlling light being used to control the position of the information light, the recording-specific reference light, and the reproduction-specific reference light with respect to the recording medium; and a position controller for controlling the position of the information light, the recording-specific reference light, and the reproduction-specific reference light with respect to the recording medium based on the position-controlling information generated by the position-controlling information generator.

17. An optical information recording/reproducing apparatus according to claim 16, wherein the information light, the recording-specific reference light, and the reproduction-specific reference light have a predetermined first wavelength, and the position-controlling light has a second wavelength different from the first wavelength.

18. An optical information recording/reproducing method for recording information in a recording medium having an information recording layer for information to be recorded in through the use of holography, one side of the information recording layer being irradiated with light for recording or reproducing information, and a reflecting surface being provided on the other side of the information recording layer, and for reproducing information from the recording medium, the method comprising:

the step of generating information light that carries information;

the step of generating recording-specific reference light;

the recording step in which the information recording layer is irradiated with the information light and the recording-specific reference light such that the information is recorded in the information recording layer in the form of an interference pattern resulting from interference between the information light and the recording-specific reference light;

the step of generating reproduction-specific reference light;

the reproducing step in which the information recording layer is irradiated with the reproduction-specific reference light, and reproduction light generated at the information recording layer when irradiated with the reproduction-specific reference light is collected; and the step of detecting the reproduction light, wherein:

in the recording step, the information light and the recording-specific reference light are projected coaxially onto the one side of the information recording layer such that the information light and the recording-specific reference light converge to a minimum diameter at an identical position located off the reflecting surface, and the information is thereby recorded in the information recording layer in the form of an interference pattern resulting from interference between the information light yet to impinge on the reflecting surface and the recording-specific reference light reflected by the reflecting surface and an interference pattern resulting from interference between the recording-specific reference light yet to impinge on the reflecting surface and the information light reflected by the reflecting surface; and in the reproducing step, the reproduction-specific reference light is projected onto the information recording layer so as to converge to a minimum diameter at the same position where the information light and the recording-specific reference light converge to the minimum diameter, and the projection of the reproduction-specific reference light and the collection of the reproduction light are performed on the one side of the information recording layer such that the reproduction-specific reference light and the reproduction light are arranged coaxially.

* * * * *